(12) United States Patent
John et al.

(10) Patent No.: US 6,813,064 B2
(45) Date of Patent: Nov. 2, 2004

(54) ELECTRO-ACTIVELY TUNABLE PHOTONIC BANDGAP MATERIALS

(75) Inventors: Sajeev John, 1087 Staghorn Court, Mississauga, Ontario (CA), L5C 3R2; Kurt Busch, Bachstrasse 51, Karlsruhe (DE), 76185

(73) Assignees: Sajeev John, Mississauga (CA); Kurt Busch, Karlsruhe (DE)

( * ) Notice: Subject to any disclaimer, the term of this patent is extended or adjusted under 35 U.S.C. 154(b) by 0 days.

(21) Appl. No.: 09/909,998

(22) Filed: Jul. 23, 2001

(65) Prior Publication Data

US 2002/0074537 A1 Jun. 20, 2002

Related U.S. Application Data

(60) Provisional application No. 60/220,197, filed on Jul. 24, 2000.

(51) Int. Cl.[7] .............................. G02F 1/00; G02F 1/03; H01Q 13/00; H01Q 15/02
(52) U.S. Cl. ....................... 359/321; 359/237; 359/245; 359/322; 343/786
(58) Field of Search ................................. 359/237, 245, 359/247, 321, 322, 326, 332; 250/214.1; 343/786, 772, 909; 372/19, 20, 92

(56) References Cited

U.S. PATENT DOCUMENTS 6,052,213 A * 4/2000 Burt et al. .................. 359/237
6,058,127 A * 5/2000 Joannopoulos et al. ....... 372/92
6,261,469 B1 * 7/2001 Zakhidov et al. ............. 216/56
6,433,931 B1 * 8/2002 Fink et al. .................. 359/586
6,445,862 B1 * 9/2002 Fajardo et al. .............. 385/125

* cited by examiner

Primary Examiner—Georgia Epps
Assistant Examiner—William Choi
(74) Attorney, Agent, or Firm—Hill & Schumacher; Lynn Schumacher

(57) ABSTRACT

The present invention provides fully tunable photonic band gap (PBG) materials. These materials are periodic composite materials comprising a high refractive index dielectric material and another optically anisotropic, birefringent, electro-optically tunable, or magneto-optically tunable material with a lower dielectric constant in which the photonic band structure can be globally or locally changed in a controlled manner by application of an external electric, magnetic, or electromagnetic field, whereby changing the refractive index properties of one or more of the dielectric constituents by application of the field modulates the photonic band structure. In one aspect of the invention, when an optically birefringent nematic liquid crystal is infiltrated into the void regions of full bandgap (PBG) material based on an inverse opal, the resulting composite material exhibits a completely tunable PBG. In particular, the three-dimensional PBG can be completely opened or closed by applying an electric field which rotates the axis of the nematic molecules relative to the inverse opal backbone. Tunable light localization effects may be realized by controlling the orientational disorder in the nematic.

64 Claims, 13 Drawing Sheets

ELECTRO-ACTIVELY TUNABLE PHOTONIC BANDGAP MATERIALS

CROSS REFERENCE TO RELATED PATENT APPLICATION

This patent application relates to U.S. Provisional Patent Application Ser. No. 60/220,197 filed on Jul. 24, 2000 entitled ELECTRO-ACTIVELY TUNABLE PHOTONIC BANDGAP MATERIALS, which is incorporated herein by reference in its entirety.

FIELD OF THE INVENTION

The present invention relates to fully tunable photonic band gap (PBG) materials and recipes for synthesis of these materials using periodic composite dielectric materials having differing indexes of refraction in which one or both of the indexes are electro-optically or magneto-optically tunable thereby permitting the photonic band structure to be tuned. More particularly the invention relates to photonic crystals and photonic band gap (PBG) materials having optical stop gaps or complete photonic band gaps in which this stop gap or complete photonic band gap can be opened, closed or readjusted, either locally or globally by means of an external electric, magnetic, or electromagnetic field.

BACKGROUND OF THE INVENTION

Photonics is the science of molding the flow of light. Photonic band gap (PBG) materials, as disclosed in S. John, Phys. Rev. Lett. 58, 2486 (1987), and E. Yablonovitch, Phys. Rev. Lett. 58, 2059 (1987), are a new class of dielectrics which carry the concept of molding the flow of light to its ultimate level, namely by facilitating the coherent localization of light, see S. John, Phys. Rev. Lett. 53, 2169 (1984), P. W. Anderson, Phil. Mag. B 52, 505 (1985), S. John, Physics Today 44, no. 5, 32 (1991), and D. Wiersma, D. Bartolini, A. Lagendijk and R. Righini, Nature 390, 671 (1997). This provides a mechanism for the control and inhibition of spontaneous emission of light from atoms and molecules forming the active region of the PBG materials, and offers a basis for low threshold micro-lasers and novel nonlinear optical phenomena. Light localization within a PBG facilitates the realization of high quality factor microcavity devices and the integration of such devices through a network of microscopic wave-guide channels (see J. D. Joannopoulos, P. R. Villeneuve and S. Fan, Nature 386, 143 (1998)) within a single all-optical microchip. Since light is caged within the dielectric microstructure, it cannot scatter into unwanted modes of free propagation and is forced to flow along engineered defect channels between the desired circuit elements.

The utility of PBG materials arises essentially from their ability to facilitate the localization of light and the controllable inhibition of spontaneous emission of light from atoms and molecules as mentioned above. Although an intensive effort has developed over the past ten years, to microfabricate PBG materials (see "Photonic Band Gap Materials" edited by C. M. Soukoulis, Kluwer Academic Publishing, Dordrecht 1996; Journal of Lightwave Technology IEEE, volume 17, number 11 (1999) Special Issue on Photonic Crystals), it is only recently that a clear route to synthesizing large scale three-dimensional PBG materials with submicron lattice constants has been demonstrated using self-assembly methods, see K. Busch and S. John, Physical Review E58, 3896 (1998); J. E. G. J. Wijnhoven and W. L. Vos, Science 281, 802 (1998); A. A. Zakhidov et. al. Science 282, 897 (1998). The application of this approach to Si, Ge and GaAs based PBG materials may open the door to applications in laser devices and telecommunications as well as to the realization of fundamentally new effects in quantum and nonlinear optics. As pointed out by Sir John Maddox, "If only it were possible to make dielectric materials in which electromagnetic waves cannot propagate at certain frequencies, all kinds of almost magical things would be possible." John Maddox, Nature 348, 481 (1990).

Recently, it has been shown that PBG materials based on silicon and germanium can be readily fabricated based on inverse opal structures. The value of the photonic band gap depends on the physical dimensions of the air voids so that fabricating the precursor opal with a given sphere size fixes the photonic band gap, U.S. Pat. No. 60/178,773 filed Jan. 28, 2000 and U.S. Pat. No. 60,202,115 filed May 5, 2000, both references being incorporated herein by reference.

For many applications, however, it would be advantageous to obtain some degree of tunability of the photonic band structure through electro-optic or magneto-optic effects. Such devices would find very broad applications in optical networking for telecommunications. The tunable PBG material would act as a tunable mirror or a switch with a latch for routing optical data from one channel to another. If such tunable PBG materials could be made they would form the basic building blocks in photonic circuits, analogous to the role of semiconductors in conventional microelectronics. In the case of semiconductors, the flow of electricity is regulated by means of applied voltages in most applications (but also by magnetic fields in some applications) which modulates the electronic band structure.

It has been proposed that such tunability may be obtained by controlling one or several forms of optical anisotropy of the constituent materials. The science of liquid crystals (see P. G. de Gennes and J. Prost, "The Physics of Liquid Crystals", Clarendon Press, Oxford 1993; S. Chandrasekhar, "Liquid Crystals", Cambridge University Press 1992; L. M. Blinov and V. G. Chigrinov, "Electro-Optic Effects in Liquid Crystal Materials", Springer, N.Y. 1994) has spawned an entire industry related to these electro-optic effects. In earlier works, however, a rather pessimistic conclusion regarding the efficacy of birefringent photonic crystals was drawn (see I. H. Zabel and D. Stroud, Phys. Rev. B48, 5004 (1993); Z. Y. Li, J. Wang, B. Y. Gu, Phys. Rev. B58, 3721 (1998); R. M. Hornreich, S. Shtrikman and C. Sommers, Phys. Rev. E47, 2067 (1993)) since attention was restricted to unrealizable structures that consist of spheres of disconnected anisotropic, high dielectric materials in an air background.

It would be very advantageous to provide an economical and technologically simple recipe for combining the high sensitivity of the photonic band structure to small variations in the refractive index with the known refractive index tunability of liquid crystals or ferro-electrics to produce PBG materials which are tunable.

SUMMARY OF THE INVENTION

It is an object of the present invention to provide photonic band gap (PBG) materials in which the band structure of a photonic crystal can be changed in a controlled manner.

The present invention provides fully tunable photonic band gap (PBG) materials and recipes for synthesis of these materials using periodic composite dielectric materials having differing indexes of refraction whereby changing the refractive index properties of one or more of the dielectric constituents by application of an external field tunes or modulates the photonic band structure in a predictable way. These composite dielectric materials may comprise a high refractive index dielectric material and another optically anisotropic, birefringent, electro-optically tunable, or magneto-optically tunable material with a lower dielectric constant in which the photonic band structure can be globally or locally changed in a controlled manner by application of an external electric, magnetic, or electromagnetic field.

Therefore, in one aspect of the invention there is provided a photonic crystal having a tunable photonic band structure, comprising;

a periodic composite dielectric material having at least two dielectric constituents including a first dielectric constituent having a first refractive index and a second dielectric constituent having a refractive index smaller than the first refractive index so that the periodic composite dielectric material has a photonic band structure; and at least one of said at least two dielectric constituents having refractive index properties which can be locally or globally changed throughout said photonic crystal in a controlled manner whereby changing the refractive index properties modulates said photonic band structure locally or globally throughout said photonic crystal for providing control of propagation of light through said photonic crystal.

In another aspect of the invention there is provided a photonic crystal having a tunable photonic band structure, comprising;

a periodic composite dielectric material having a first dielectric constituent having a first refractive index and void regions located periodically throughout a volume of said periodic composite dielectric material, a second dielectric constituent located in said void regions having a second refractive index sufficiently smaller than the first refractive index so that the periodic composite dielectric material has a photonic band structure; and at least one of said first and second dielectric constituents being optically anisotropic and having refractive index properties which can be locally or globally modified in a controlled manner whereby changing the refractive index properties changes said photonic band structure for providing control of propagation of light through said photonic crystal.

The high refractive index constituent may be a semiconductor material such as silicon, germanium, gallium phosphide, gallium arsenide, indium phosphide or some other high refractive index semiconductor and the photonic band gap (PBG) materials may have optical stop gaps or complete photonic band gaps in which this stop gap or complete photonic band gap can be opened, closed or readjusted, either locally or globally by means of an external electric, magnetic, or electromagnetic field.

In one aspect of the invention the fully tunable PBG material includes an inverted opal comprising periodic air inclusions in a high refractive index semiconductor backbone. An optically anisotropic or birefringent material, and more specifically a low index nematic liquid crystal (or ferro-electric) is infiltrated into the void regions of an inverse opal. The low index nematic liquid crystal may be bis ethylhexyladipate (BEHA), or more generally any material with refractive index anisotropy na=1.6 and nb=1.4. The three-dimensional PBG can be completely opened or closed by applying an electric field which rotates the axis of the nematic molecules (or ferro-electric polarization) relative to the inverse opal backbone. This complete tunability arises from the very high sensitivity of the photonic band structure of the inverse opal structure to small variations in the refractive index. The refractive index change is induced by an external voltage so that the flow of light is steered by an external voltage that modulates the photonic band structure through a linear electro-optic effect.

The present invention is not restricted to using optically anisotropic materials infiltrated into the voids of the backbone. For example, the photonic crystal dielectric composite may be comprised of a tunable backbone, with high refractive index, and a periodic array of air holes. Alternatively, the photonic crystal may comprise a non-tunable backbone and one or more tunable (optically anisotropic) materials which either fill or partially fill the air pores.

In another aspect of the invention there is provided a method of tuning a photonic band structure in a photonic crystal, comprising;

providing a photonic crystal having a periodic composite dielectric material including a first dielectric constituent having a first refractive index, and at least a second dielectric constituent having a second refractive index sufficiently smaller than the first refractive index so that the periodic composite dielectric material has a photonic band structure; and globally or locally changing the refractive index properties of one of said first and second dielectric constituents in a controlled manner so that said photonic band structure is changed in a controlled manner by application of one of an electric, magnetic and electromagnetic field for providing control of propagation of light through said photonic crystal.

BRIEF DESCRIPTION OF THE DRAWINGS

The photonic crystals having tunable photonic band structures in accordance with the present invention will now be described, by way of example only, reference being made to the accompanying drawings, in which.

DETAILED DESCRIPTION OF THE INVENTION

The present invention provides two and three-dimensional composite dielectric materials having tunable stop gaps or photonic band gaps (PBG). A stop gap is a window in the frequency spectrum of electromagnetic waves where propagation is forbidden in one specific direction whereas a complete photonic band gap is a frequency window in which electromagnetic wave propagation is forbidden in all directions. The tunability, or ability to modulate, the photonic band structure of the composite materials (including a photonic bandgap if present) arises from the very high sensitivity of the photonic band structure of one or more of the dielectric constituents to small variations in the refractive index. The variations in the refractive index of one or more of the dielectric constituents of the composite material may be globally or locally controlled by application of an external field. The invention will be illustrated by several non-limiting Examples.

EXAMPLE 1

Infiltration of an Inverse Opal PBG Material with a Nematic Liquid Crystal

Figure 1:
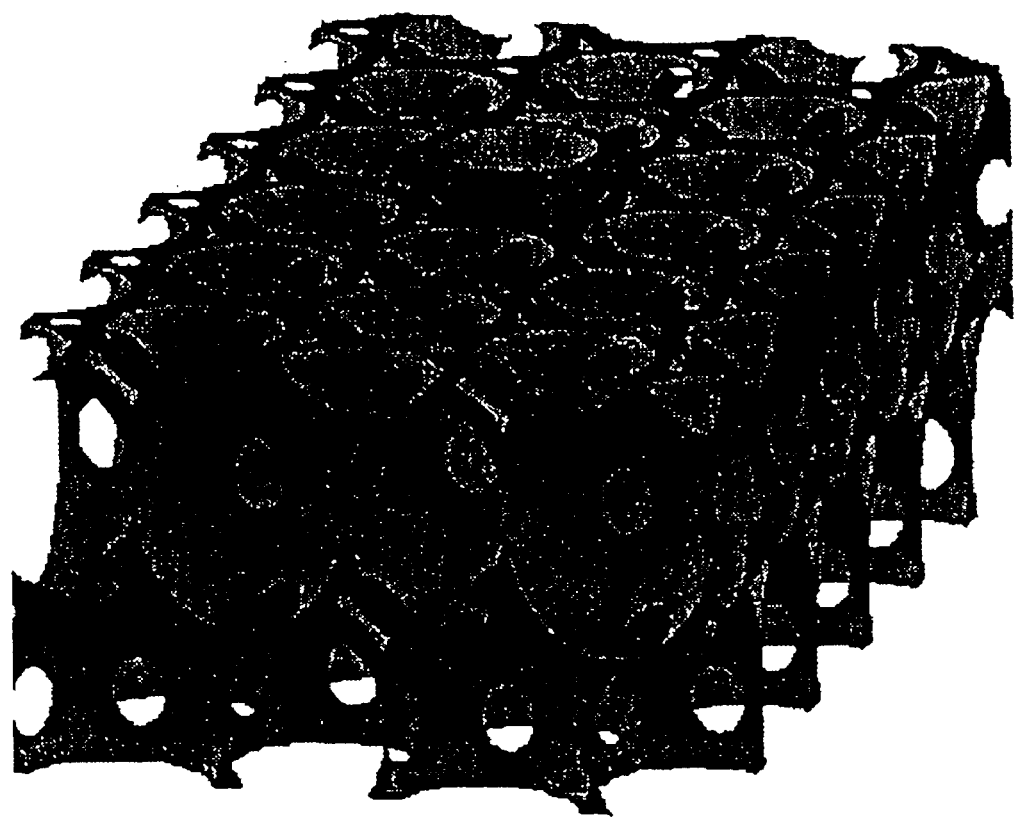
FIG. 1 shows a cross-sectional view through the inverse opal backbone (blue) resulting from incomplete infiltration of silicon into the air voids of an artificial opal. After etching out the template, a (face centered cubic) fcc lattice of overlapping air spheres remain and additional air voids appear as triangular or diamond shaped holes on the surface of the cut. A tunable PBG is obtained by infiltrating this backbone with nematic liquid crystal (yellow) which wets the inner surface of each sphere (only one is shown in the figure).

The development below discloses detailed results on producing fully tunable PBG materials comprising inverted opals made of silicon into which an optically anisotropic or birefringent material, and more specifically a nematic liquid crystal or ferro-electric, is infiltrated into the void regions of an inverse opal preferably having a fcc lattice of overlapping air spheres, see FIG. 1.

It is now well known that inverse opal structures, i.e., air inclusions in a high dielectric backbone material such as silicon provide a much more efficient scattering system both for ordered (see K. Busch and S. John, Phys. Rev. E58, 3896 (1998) and H. S. Sozuer, J. W. Haus, and R. Inguva, Phys. Rev. B45, 13962 (1992)) as well as disordered (see K. Busch and C. M. Soukoulis, Phys. Rev. Lett. 75, 3442 (1995)) structures. For these inverse opals the optimal filling ratios of the high dielectric backbone lies around 24.5%, leaving a large empty volume for infiltration by a low refractive index liquid crystal with strong optical anisotropy. This large volume of birefringent material makes the resulting composite system highly efficacious for electro-optic tuning effects. In particular, a change in the orientation of the nematic director field with respect to the inverse opal backbone by application of an external electric field can completely open or close the full, three-dimensional PBG.

For the low index nematic liquid crystal bis ethylhexyla-dipate (BEHA), na is the refractive index when the electric field of incident light is parallel to the nematic director and nb is the refractive index when this field is perpendicular to the director. For an inverse structure based on silicon it is shown that a 2% photonic band gap may be opened or closed, by changing the orientation of the nematic director. In addition, the thermally driven nematic to isotropic liquid phase transition provides further tunability of the PBG. Localized states of light may be created through random fluctuations as well as through singularities (textures) in the nematic director field.

In order to determine the photonic band structure of anisotropic crystals we start with the wave equation satisfied by the magnetic field for a three-dimensional periodic array of scatterers $$\vec{\nabla} \times [\varepsilon^{-1}(\vec{r})\vec{\nabla} \times \vec{H}(\vec{r})] - \frac{\omega^2}{c^2}\vec{H}(\vec{r}) = 0, \qquad (1)$$

where $\vec{\nabla}\cdot\vec{H}(\vec{r})=0$. The dielectric tensor $\varepsilon(\vec{r}+\vec{R})=\varepsilon(\vec{r})$ is periodic with respect to the set $R=\{n_1\vec{a}_1+n_2\vec{a}_2+n_3\vec{a}_3; (n_1,n_2,n_3)\in Z^3\}$ of lattice vectors $\vec{R}$ generated by the primitive translations $\vec{a}_i, i=1,2,3$ that describe the structure of the photonic crystal. It may be expanded in a Fourier series on G the reciprocal (dual) lattice corresponding to $\vec{R}$:

$$\varepsilon(\vec{r}) = \sum_{\vec{G} \in G} \varepsilon_{\vec{G}} e^{i\vec{G}\vec{r}} \qquad (2)$$

Figure 10:
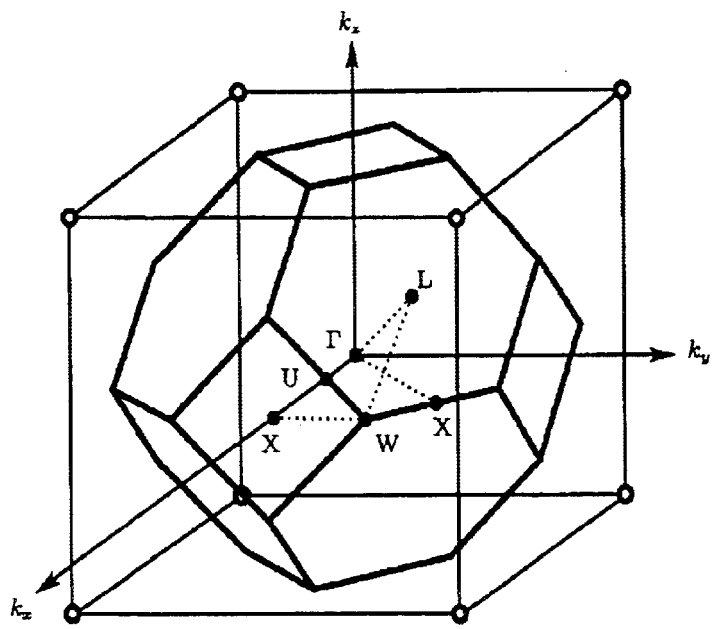
FIG. 10 shows the Brillouin zone of the face centered cubic (fcc) lattice with the symmetry points L, U, X, W, and K in wave vector $k=(k_x,k_y,k_z)$ space labeled $\Gamma$ corresponds to the origin.

Eq. (1) comprises a set of three coupled differential equations with periodic coefficients. Using the Bloch-Flouquet theorem, we may expand the magnetic field as:

$$\vec{H}(\vec{r}) \equiv \vec{H}_{\vec{k}}(\vec{r}) = \sum_{\vec{G} \in G} \sum_{\lambda=1}^{2} h_{\vec{G}}^{\lambda} \hat{e}_{\vec{G}}^{\lambda} e^{i(\vec{k}+\vec{G})\vec{r}}, \qquad (3)$$

where λ labels the two transverse polarizations for any plane wave such that $$\hat{e}_{\vec{G}}^{\lambda=1,2}$$

and $\vec{k}+\vec{G}$ form an orthogonal triad. Due to the discrete translational symmetry of the lattice, the wave vector $\vec{k}$ labeling the solutions may be restricted to lie in the first Brillouin zone (BZ) as depicted in FIG. 10. However, care must be exercised in identifying the irreducible part of the Brillouin zone (IBZ): The dielectric tensor in Eq. (1) may have less rotational symmetries than the underlying lattice and consequently, the IBZ for a photonic crystal containing anisotropic materials may be considerably larger than the IBZ for the corresponding isotropic crystal. Rather than dealing with an IBZ that changes from problem to problem, we choose to work with the standard IBZ for the isotropic material and solve Eq. (1) not only for the given form of the dielectric tensor, but also for all inequivalent transformations of it with respect to the rotational symmetries of the underlying lattice.

Consider an optimized inverted opal comprises of a connected high index backbone material such as silicon with total volume fraction of 24.5% (see K. Busch and S. John, Phys. Rev. E58, 3896 (1998)). This structure consists of an fcc lattice of close packed air spheres where the space between the spheres has been 97 percent filled with silicon leaving only tiny air voids between the air spheres. The air spheres themselves are now partially infiltrated with a nematic liquid crystal that wets the interior surface and results in a homogeneous coating (see FIG. 1). The corresponding dielectric tensor is given by:

$$\varepsilon(\vec{r}) = 1 + \varepsilon_{is} \sum_{\vec{R} \in R} S_{is}(\vec{r}+\vec{R}) + \varepsilon_{LC} \sum_{\vec{R} \in R} S_{LC}(\vec{r}+\vec{R}) \qquad (4)$$

where $S_{is}$ and $S_{LC}$ describe the location of the optically isotropic backbone (is) and the Liquid Crystal (LC) material, respectively, within a Wigner-Seitz cell. $S_{is}(\vec{r})$ is unity if $R_0 \leq |\vec{r}| \leq R_c$ and zero elsewhere while $S_{LC}(\vec{r})$ is unity for $R_i \leq |\vec{r}| \leq R_0$ and zero elsewhere. For the optimized opal $R_0/a = 1/\sqrt{8}$, $R_i/a = 0.281$ and $R_c/a = 0.44$ where a is the cubic lattice constant of the fcc lattice. The dielectric tensor for silicon is proportional to the unit tensor, i.e., $\varepsilon_{is} = (\varepsilon_{Si}-1)\mathbf{1}$ ($\varepsilon_{Si} \approx 11.9$). For bulk nematic liquid crystal we may choose a coordinate system in which the dielectric tensor is diagonal with principal entries $\varepsilon_{LC}^{\|}$ parallel and $\varepsilon_{LC}^{\perp}$ perpendicular to its director n̂, respectively. For the inverse opal, the coordinate system is fixed by the high index backbone and the director n̂ can have different orientations with respect to this reference frame. Consequently, the dielectric tensor of the nematic takes the form $$\varepsilon_{LC} = O(\theta,\phi) \text{diag}(\varepsilon_{LC}^{195}, \varepsilon_{LC}^{195}, \varepsilon_{LC}^{\|}) O^T(\theta,\phi) - 1 \qquad (5)$$

where $O(\theta,\phi)$ is a rotation matrix which acts on the corresponding diagonalized tensor. The angles θ and φ describe the orientation of the director n̂ with respect to the inverse opal coordinate system (see FIG. 1). Clearly, the subset of inequivalent rotational transformations (chosen from the larger group of rotational symmetries of the backbone) depends crucially on the orientation of n̂. As mentioned above, by restricting ourselves to the standard IBZ of the fcc lattice we must compensate by computing the band structures for all distinct dielectric tensors in the set $$E = \{\varepsilon_{LC}^{(s)} = S\varepsilon_{LC}S^T, S \in S\}$$

Here S is the lattice point group which in the case of an fcc lattice has 48 elements. This algorithm is equivalent to computing a single band structure throughout the actual IBZ of the birefringent PBG material. As an example, consider the case φ=0: It is easily checked that for θ=0 the set E has three elements whereas for θ≠0 the set E has six elements. In the general case φ≠0,θ≠0 there are twelve inequivalent transformations of $\varepsilon_{LC}$ (for n̂∥(1,1,1), i.e., φ=π/4 and θ=cos⁻¹(1/√3) the set E contains only four elements).

Inserting Eqs. (2) and (3) into Eq. (1) results in an infinite matrix eigenvalue problem $$\sum_{\vec{G}' \in G} \sum_{\lambda'=1}^{2} M_{\vec{G}\vec{G}'}^{\lambda\lambda'} h_{\vec{G}'}^{\lambda'} = \frac{\omega^2}{c^2} h_{\vec{G}}^{\lambda} \qquad (6)$$

where the matrix elements $$M_{\vec{G}\vec{G}'}^{\lambda\lambda'}$$

are given by $$M_{\vec{G}\vec{G}'}^{\lambda\lambda'} = |\vec{k}+\vec{G}|(\hat{e}_{\vec{G}}^{\lambda} \cdot \varepsilon_{\vec{G}-\vec{G}'}^{-1} \cdot \hat{e}_{\vec{G}'}^{\lambda'})|\vec{k}+\vec{G}'|. \qquad (7)$$

For numerical purposes Eq. (6) is truncated by retaining only a finite number of reciprocal lattice vectors (see K. Busch and S. John, Phys. Rev. E58, 3896 (1998)). In the case of birefringent or biaxial dielectric materials, the dielectric tensor $\varepsilon(\vec{r})$ in Eq. (2) is real and symmetric. For materials with inversion symmetry, $\varepsilon(\vec{r}) = \varepsilon(-\vec{r})$ Eq. (6) is likewise a standard real symmetric eigenvalue problem. The main numerical problem in obtaining the eigenvalues from Eq. (6) is the evaluation of the Fourier coefficients of the inverse dielectric tensor in Eq. (7). As in the case of isotropic dielectric materials, this can be done in two different ways: One can calculate the inverse dielectric tensor in real space and then compute its Fourier coefficients. We refer to this as the direct method. Alternatively, one can calculate the matrix of Fourier coefficients of the real space tensor and then take its inverse to obtain the required Fourier coefficients. The latter method was shown by K M. Ho, C. T. Chan and C. M.

Soukoulis (HCS) Phys. Rev. Lett. 65, 3152 (1990), to be more efficient than the direct method for the isotropic dielectric tensor. Since both Fourier transformation and matrix inversion are linear operations, for a complete set of plane waves the eigenvalue spectrum obtained by the direct method and for the HCS method must coincide exactly. However, we are numerically restricted to operate on a finite dimensional subspace of the full reciprocal space. This leads to dramatically different rates of convergence of the two methods as the dimension of the subspace (number of plane waves) is increased. Just as in the case of isotropic dielectric materials, for the birefringent PBG, we find that the HCS method converges substantially faster than the direct method. For instance, eigenfrequencies computed with HCS method for 531 and 1219 plane waves, respectively, differ at most by 0.01% of their absolute value, whereas with the direct method the results vary by more than 10%. The results presented below were obtained with HCS method using 531 plane waves.

Figure 2:
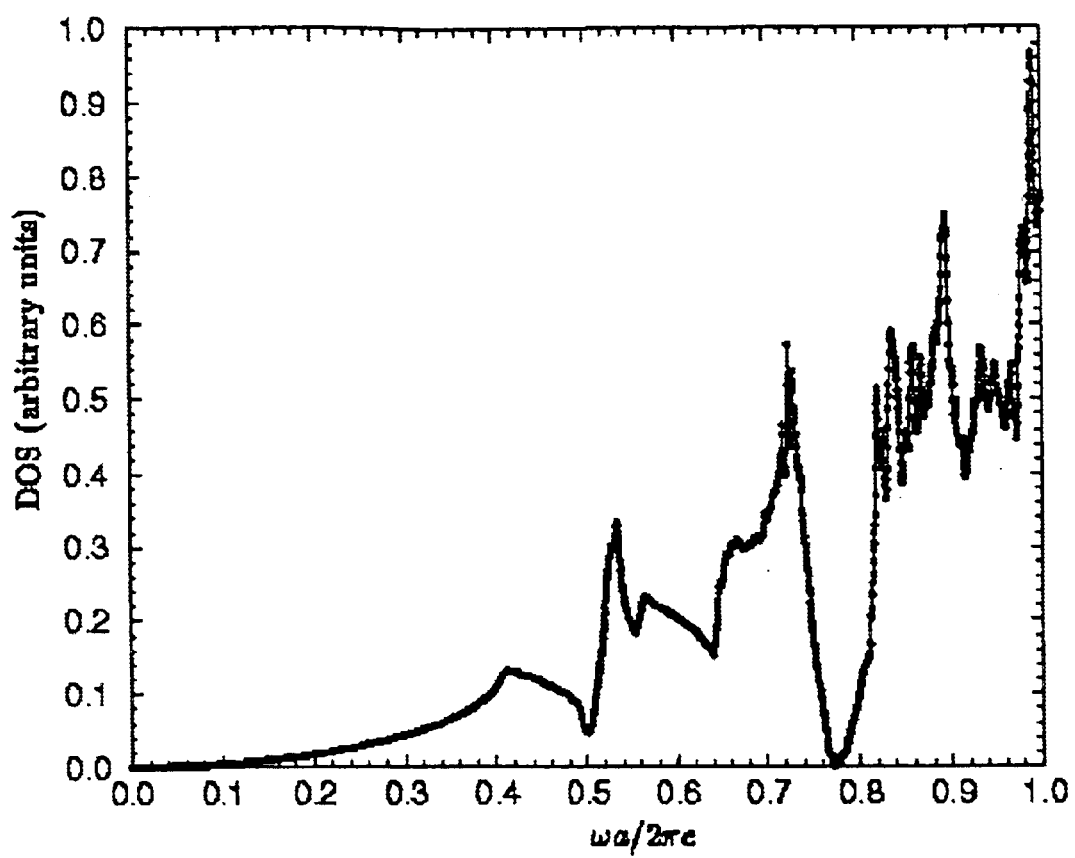
FIG. 2 shows the total DOS for an inverse opal which is infiltrated with a nematic liquid crystal. The nematic director is orientated along the (0,0,1) axis of the inverse opal backbone. The inverse opal backbone is made of silicon (24.5% by volume) which is in filtrated with the liquid crystal BEHA (36.8% by volume). The isotropic refractive index of silicon is and the principal refractive indices of BEHA are $n_{LC}^{\parallel}=1.6$ and $n_{LC}^{\perp}=1.4$.

We now evaluate the tunable band structure of the inverted opal described above, made of silicon. This structure, which consists of about 24.5% silicon by volume, has a 8.6% band gap between bands 8 and 9. Next, we partially infiltrate the nearly 75% void regions with the nematic liquid crystal BEHA (see L. M. Blinov and V. G. Chigrinov, "Electro-Optic Effects in Liquid Crystals", Springer, N.Y. 1994) such that it wets the inner surface of the air spheres. The principal indices of refraction for BEHA are $n_{LC}^{\parallel}=1.6$ and $n_{LC}^{\parallel}=1.4$. We choose $R_i=0.2812a$ so that roughly half the void volume is filled with BEHA and the total volume fraction of BEHA is 36.8%. In FIG. 2 we show the total photon density of states (DOS) when the nematic director $\hat{n}$ is oriented along the (0,0,1) axis of the fcc backbone. The complete 8.6% photonic band gap of the inverse opal backbone is destroyed upon infiltration of the liquid crystal but a pronounced pseudo-gap with a low DOS remains. The closing of the band gap between bands 8 and 9 for $\hat{n}=(0,0,1)$ occurs first at the W-points of the full Brillouin zone (see FIG. 10) which experience a strong anisotropy. If $\hat{n}$ is rotated away from the (0,0,1) direction, different high symmetry points in the Brillouin zone will be affected differently. Most notably, the anisotropy seen by the W-points will is reduced.

Figure 3:
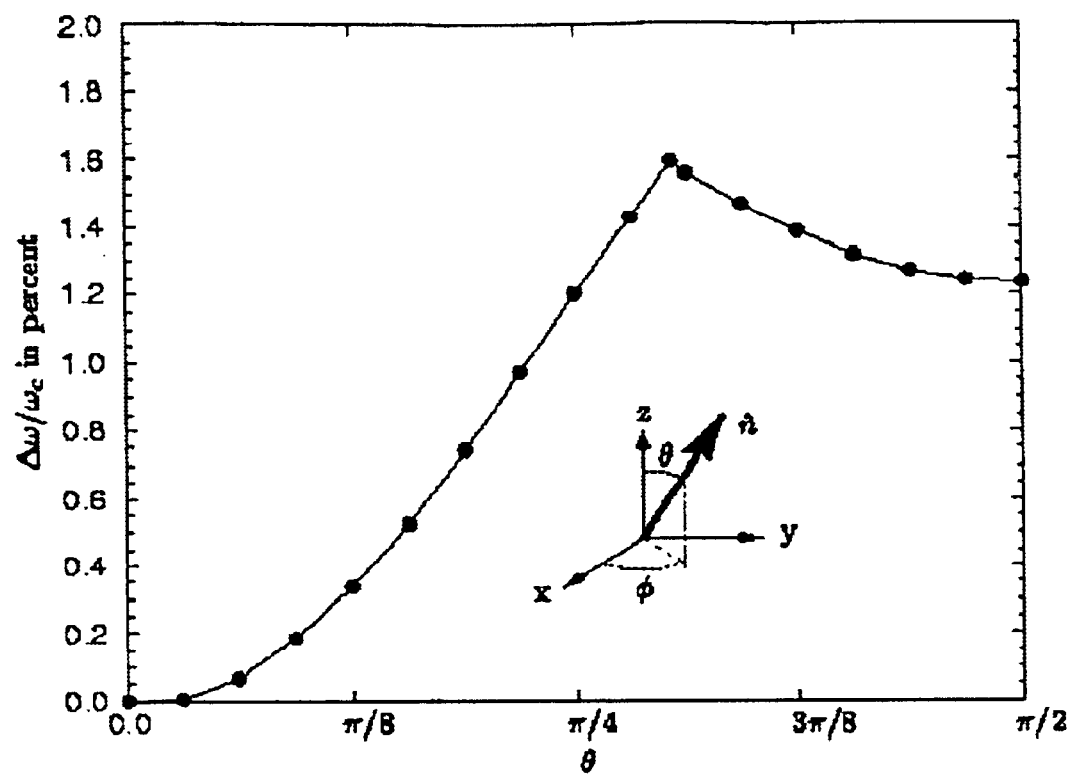
FIG. 3 shows the dependence of the photonic band gap size for a silicon inverted opal infiltrated with the nematic liquid crystal (BEHA) on the orientation of the nematic director $\hat{n}(\phi,\theta)$ for fixed angle $\phi=\pi/4$. The volume fractions are the same as in FIG. 2.

In FIG. 3 we display the dependence of the gap size between band 8 and 9 as $\hat{n}$ rotates from (0,0,1) through (1,1,1) to the (1,1,0) direction. In terms of spherical coordinates, $\phi=\pi/4$ and $\theta$ ranges from 0 to $\pi/2$. For the liquid crystal PBG material, this leads to an opening of a complete photonic band gap. The PBG reaches a maximum value of 1.6%, when $\hat{n}$ points along the (1,1,1) axis, direction for which the anisotropy as seen by the W-point is at a minimum. The effect of reorienting $\hat{n}$ on the photon density of states is further illustrated in FIG. 4, where, for fixed $\phi=\pi/4$ we consider various values of the angle $\theta$. This clearly demonstrates an electro-optic shutter effect to the complete three-dimensional photonic band gap which may be realized by an external electric field that controls the orientation of the nematic molecules.

As stated in the background, the utility of PBG materials arises from the two fundamental optical principles which they facilitate: (i) the localization of light and (ii) the control of spontaneous emission. The tunable liquid crystal PBG material disclosed herein can facilitate electro-optic modulation of laser light emission along the W-direction from active molecules placed within the material. It will also facilitate an electro-optical tuning of the propagation and localization of light in the vicinity of the gap. For a thermally disordered nematic liquid crystal, a dramatic modification of the Ioffe-Regel criterion (see A. I. Ioffe and A. R. Regel, Prog. Semicond. 4, 237 (1960)) for localization may be realized. Light localization in a disordered dielectric medium is expected (see S. John, Phys. Rev. Lett. 53, 2169 (1984) and S. John and R. Rangarajan, Phys. Rev. B38, 10101 (1988)) when:

$$\pi^2 c\rho(\omega)(l^*)^2 \approx 1 \tag{8}$$

Here, c is the speed of light in vacuum, $\rho(\omega)$ is the photon density of states at frequency $\omega$ and $l^*$ is the transport mean free path for photons, determined by the extent of disorder in the medium. For photons in ordinary vacuum $\omega=c$, $\rho(\omega)=\omega^2/\pi^2 c^3$ and this condition reduces to the Ioffe-Regel condition, $l^*(\omega/c) \gg 1$. However, in the liquid crystal PBG material, $l^*$ represents the transport mean free path for optical Bloch waves arising from the deviations of the medium from perfect periodicity. The very low DOS (depending on the orientation of $\hat{n}$ at the bottom of the pseudo-gap or near the complete band gap, provides a very favorable scenario for the photon localization according to criterion (8) even when $l^*(\omega/c) \gg 1$. For a nematic which is well ordered and fully aligned in the (1,1,1) direction, tunable waveguiding effects may be realized by locally applying an electric field which re-orients the nematic director field along the (1,0,0) direction along specific channels that pass through the PBG material. The resulting tunability of spontaneous emission, waveguiding effects, and light localization may considerably enhance the technological utility of liquid crystal photonic band gap materials over and above their that of either a bulk liquid crystal or a conventional photonic crystal by itself.

Figure 4:
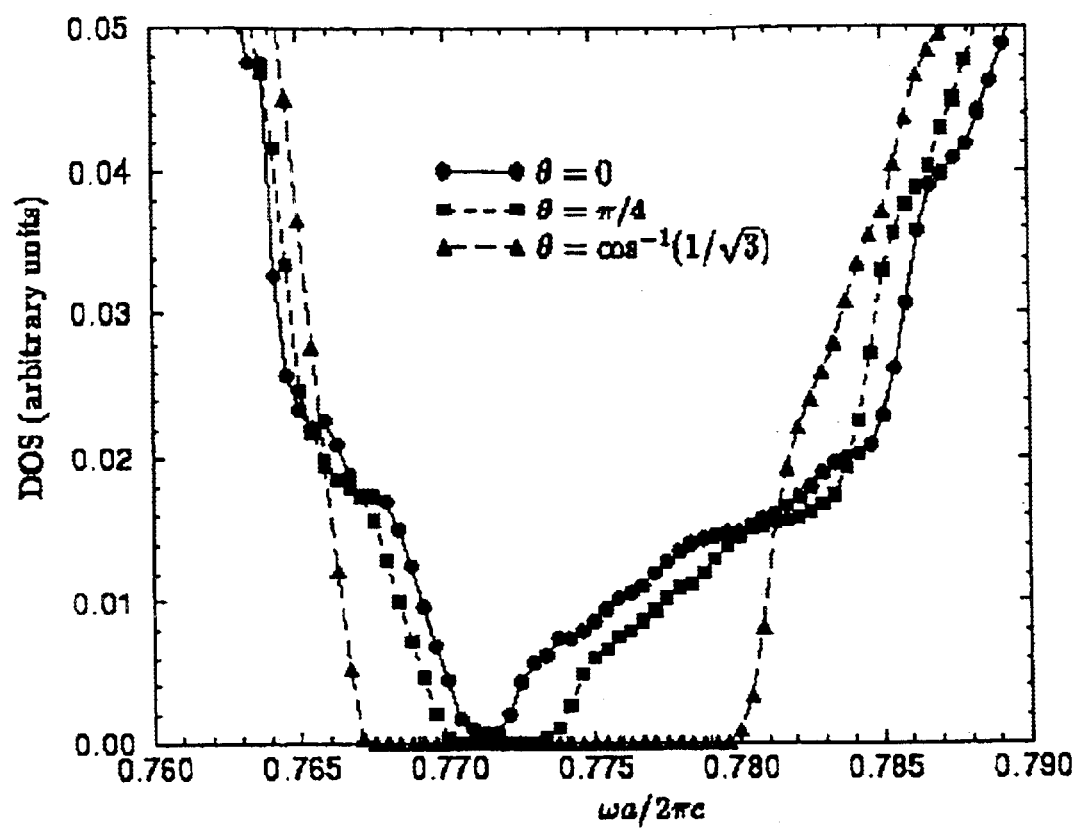
FIG. 4 shows the total photon density of states (DOS) for a silicon inverse opal which is infiltrated with the nematic liquid crystal (BEHA) for various orientations of the nematic director $\hat{n}(\phi,\theta)$. The angle $\phi=\pi/4$ is fixed and the volume fractions are the same as in FIG. 2. The PBG is closed for $\theta=0$ but reaches a maximum value $\Delta\omega/\omega_c \approx 1.6\%$ relative to its center frequency $\omega_c$ for $\hat{n}=(1,1,1)/\sqrt{3}$.

EXAMPLE 2
Variation of Bands in the Silicon-inverted Opal with Complete Infiltration with BEHA and Applications of Tunable PBG Materials In FIGS. 2 to 4 the silicon inverse opal PBG material was only partially infiltrated with liquid crystal BEHA so as to facilitate complete opening and closing of the PBG. For many applications, complete tunability of the PBG is not required. Important optical steering and routing effects may be realized by simply having a highly tunable band structure without a complete PBG for any orientation of the nematic director field.

We consider an optimal (24.5% by volume) silicon-inverted opal as the isotropic backbone. The close-packed air spheres have been fully (100%) infiltrated with the nematic liquid crystal BEHA (indices 1.4 and 1.6). Shown below is a piece of the irreducible Brillouin zone with the coordinates of the high-symmetry points given by:

$X=2\Pi/a(1,0,0);$ $U=2\Pi/a(1,1/4,1/4);$ $L32\ 2\Pi/a(1/2,1/2,1/2);$ $W=2\Pi/a(1,1/2,0);$ $K=2\Pi/a(3/4,3/4,0);$

Figure 5:
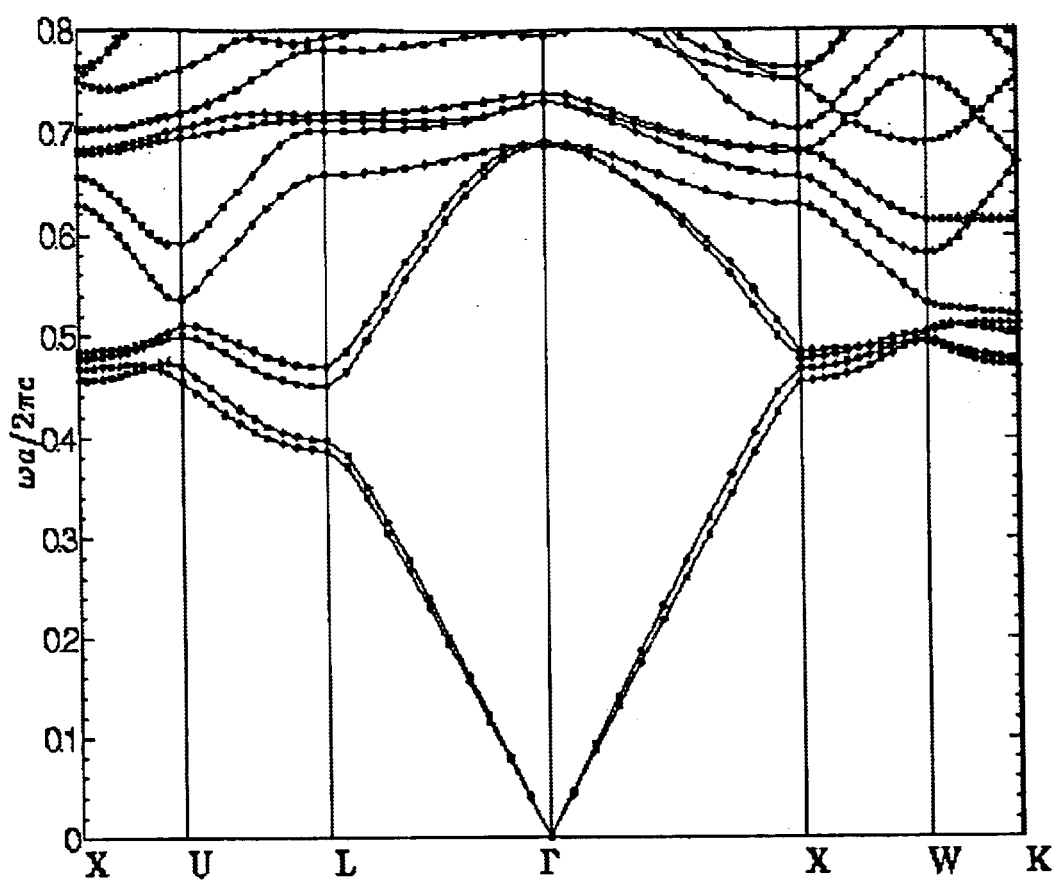
FIG. 5 shows the photonic band structure of a silicon inverse opal which has been fully infiltrated with liquid crystal BEHA.

The orientation of the nematic director is along the cubic z-axis. FIG. 5 shows the photonic band structure of such an silicon inverse opal which has been fully infiltrated with liquid crystal BEHA. FIGS. 6 to 9 illustrate how selected stop-band-edges are shifted when the director is re-oriented to angles $\phi=\Pi/4$(fixed) between x- and y-axis and angle $\theta$ away from the z-axis (no complete gap is found for any orientation of the director in the case of complete infiltration).

Figure 6:
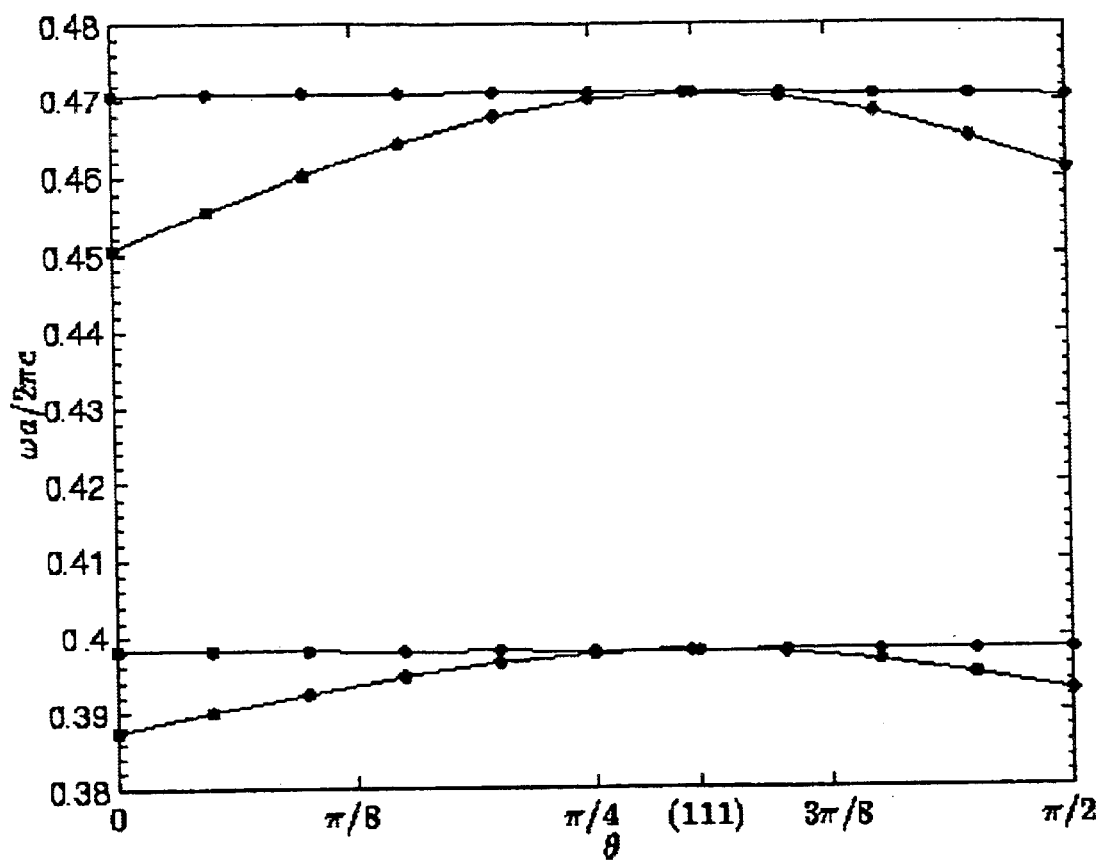
FIG. 6 shows the variation at the L-point for bands 1–4 taken from FIG. 5.
Figure 7:
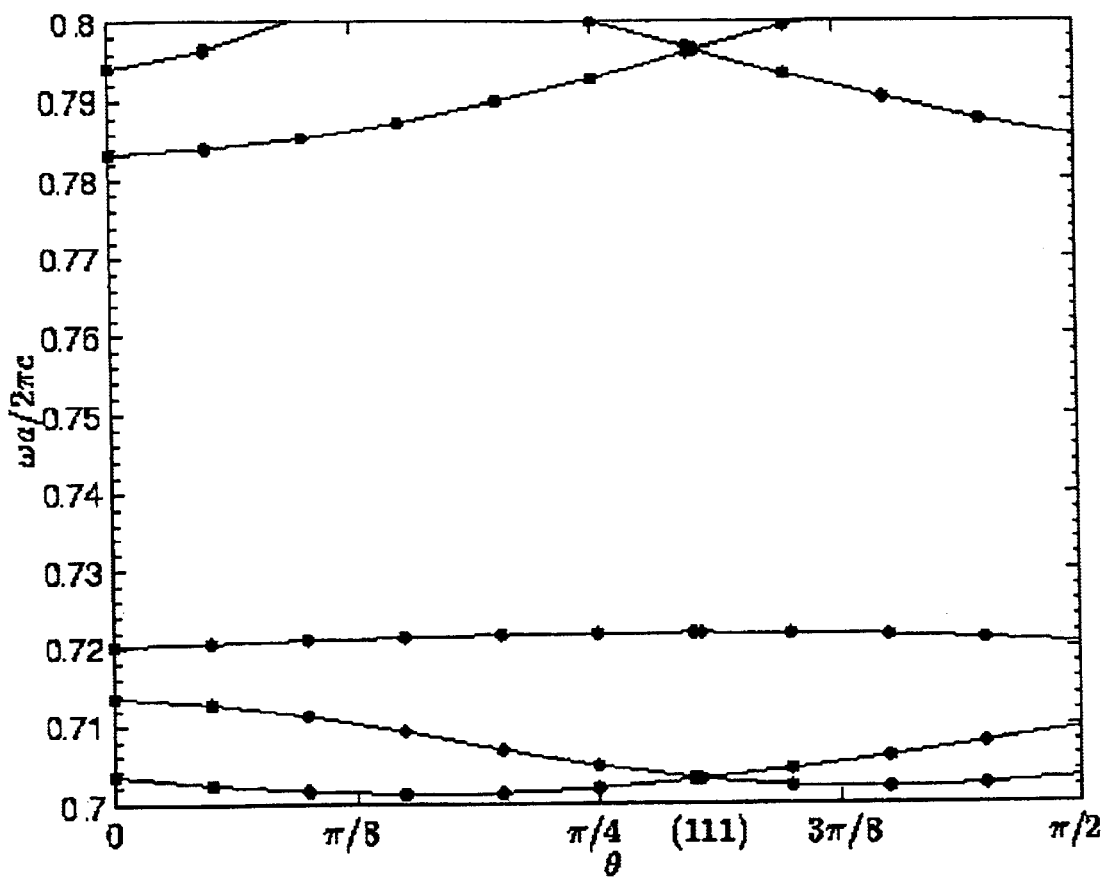
FIG. 7 shows the variation at the L-point for bands 6–10 taken from FIG. 5.
Figure 8:
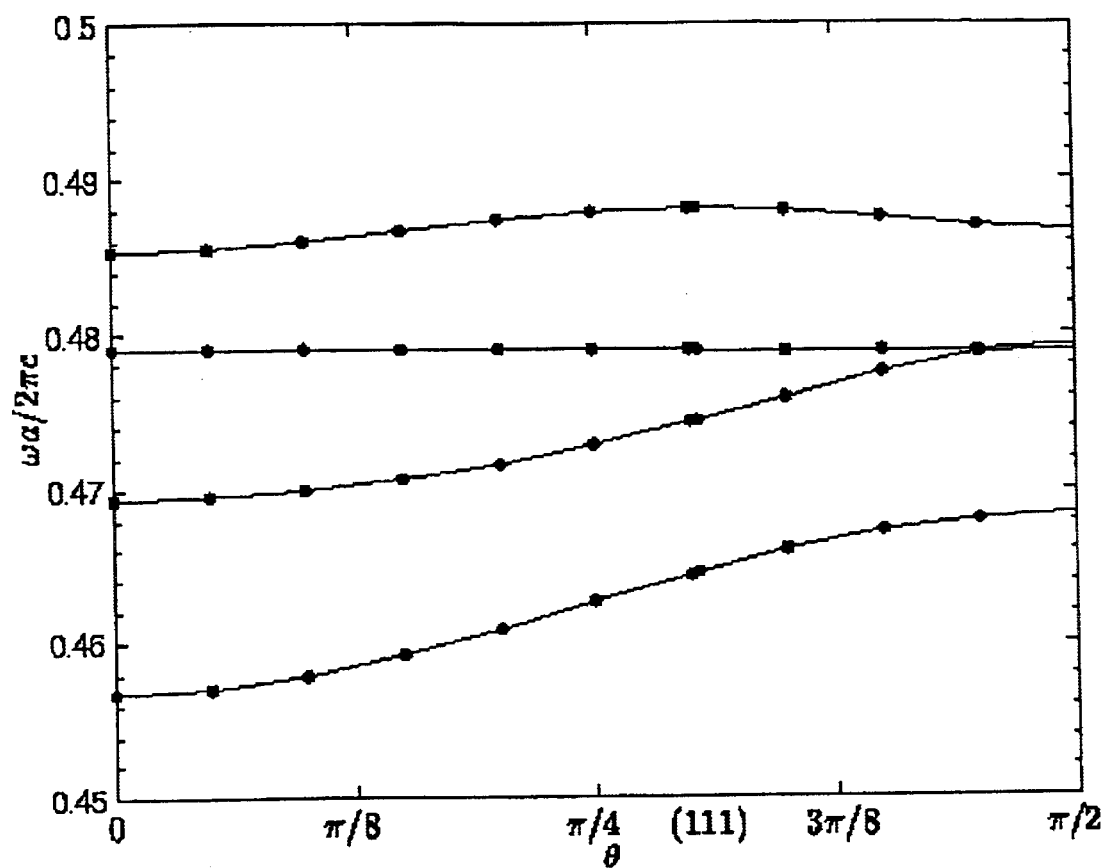
FIG. 8 shows the variation at the X point for bands 1–4 taken from FIG. 5.
Figure 9:
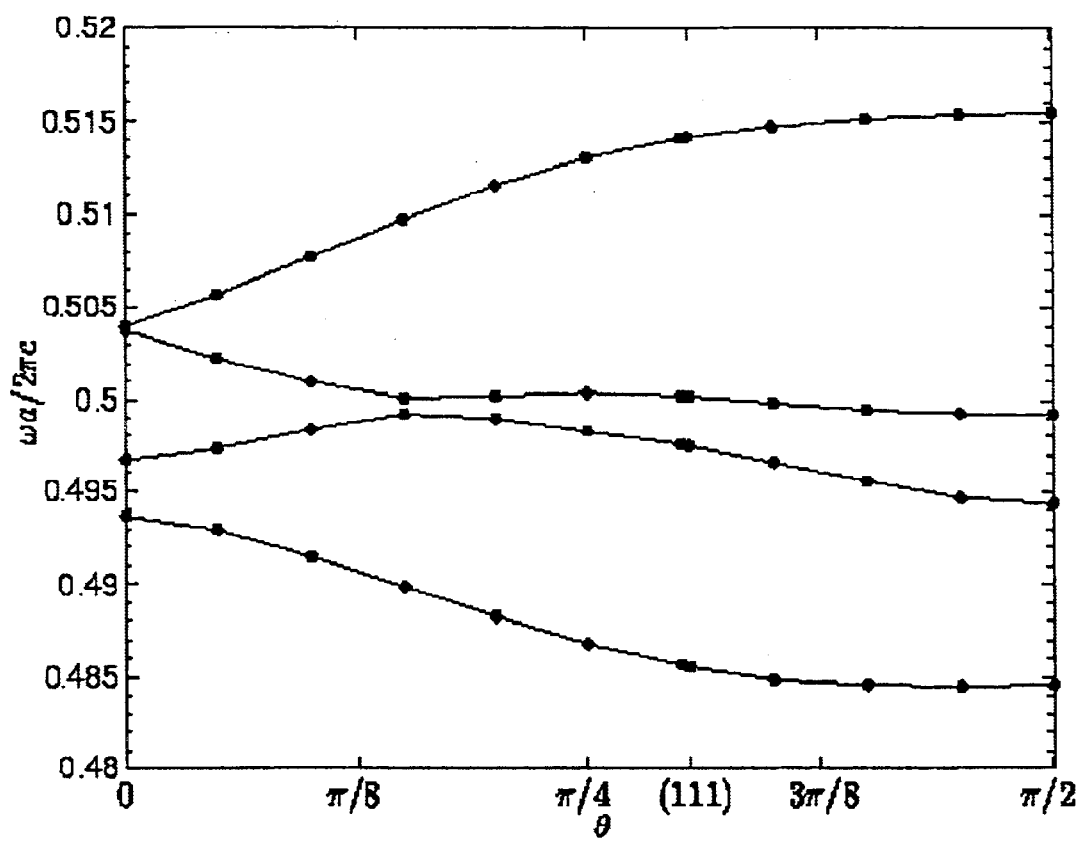
FIG. 9 shows the variation at the W-point for bands 1–4 taken from FIG. 5.

The significant variations in the photon dispersion relations and in particular the stop band edges along the L, X, and W directions illustrate the super-electro-optic modulation effects of the present invention. For example FIG. 6 shows the movement of the $3^{rd}$ band from 0.45 to 0.47 (dimensionless frequency) as the applied d.c. electric field (external voltage) is rotated from the (1,0,0) z-direction to the (1,1,1) direction. If the lattice constant, a, of the photonic crystal is chosen so that 0.45 (dimensionless frequency) corresponds to 1.5 micron wavelength, then the photon dispersion curve near the L point is shifted over a band of more than 60 nanometers in width as the d.c. field is rotated. This illustrates the use of the infiltrated inverse opal material as a tunable optical filter which can selectively pass or stop light over a significant bandwidth.

Another application of the tunable photonic crystal concept is to routing or steering the direction of light that reflects from the crystal or diffracts through the crystal. It has previously been suggested (H. Kosaka et. al. Physical Review B 58, R10096 (1998); H. Kosaka et. al. Applied Physics Letters 74, 1370 (1999)) that 2-d photonic crystals could be utilized for "superprism" effects or wavelength dependent angular beam steering. In this earlier work there was no tunability of the beam steering effect. In our tunable photonic crystal, the steering of light can be modulated over a large range of angles by the application of a variable external voltage. The electro-actively tunable photonic crystal disclosed herein can be used as a tunable mirror or diffraction grating that selectively routes telecommunication signals in an all-optical network without recourse to complicated electronic controls that physically rotate a mirror.

A third application of the tunable photonic crystal is to frequency tunable, low threshold microlasers. It has been suggested (S. John and T. Quang, Physical Review Letters 74, 3419 (1995)) and experimentally demonstrated that when a light emitter is placed within a PBG material (or more generally a photonic crystal) that laser light emission will occur preferentially at frequencies and directions corresponding to specific features in the photonic band structure such as a stop band edge. If a broad band emitter is placed within the tunable photonic crystal, then the frequency of laser light emission can be controllably tuned through the range of frequencies spanned by the stop band edge as the applied electric field is varied. When this principle is applied in the visible spectrum, this could lead to an array of light emitting pixels whose color can be modulated by an external voltage.

The development above discloses detailed results on producing fully tunable three-dimensional PBG materials comprising inverted opals made of silicon into which the low index nematic liquid crystal is infiltrated. However, as will be more fully discussed hereinafter, the principle disclosed is equally applicable to three-dimensional photonic crystals which are distinct from the inverse opal structure (such as the "woodpile" structure of S. Y. Lin and J. G. Fleming, IEEE J. Lightwave Technology 17, 1944 (1999) and S. Noda et al., IEEE J. Lightwave Technology 17, 1948 (1999), the "inverse diamond" structure of K. M. Ho et al., Phys. Rev. Lett. 65, 3152 (1990), the "Yablonovite" structure of E: Yablonovitch et al., Phys. Rev. Lett. 67, 2295 (1991), and the "spiral pillar" structure of Chutinan et al., Phys. Rev. B57, R2006 (1998)), to semiconductor backbones distinct from silicon, and a wide variety of different infiltrated materials and to two dimensional PBG materials. In addition, useful photonic crystals may be produced according to the present invention having a tunable band structure but not necessarily a complete photonic bandgap.

Figure 11:
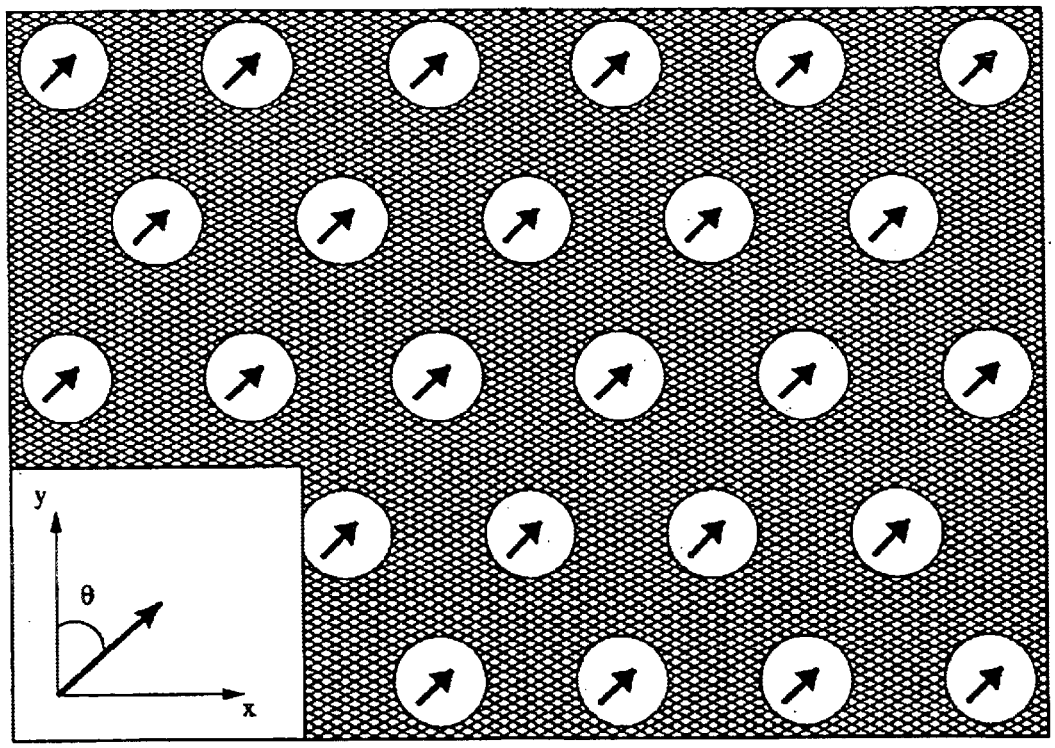
FIG. 11 shows the top view of a 2-d photonic crystal consisting of a triangular lattice of macropores (white circles) in a high index background (hatched region). The arrows inside the circles show the orientation of the high polarizability axis of the optically anisotropic material (nematic liquid crystal) that fills the macropores. The orientation of this axis is described by the angle $\theta$.

EXAMPLE 3
Variation of Bands in Two-dimensional Macroporous Silicon Photonic Crystals In the previous Examples, the three-dimensional silicon inverse opal PBG material completely as well as partially infiltrated with liquid crystal BEHA has been considered so as to facilitate complete opening or closing of the PBG as well as to realize optical steering and routing effects through a highly tunable band structure. For many applications, a three-dimensional photonic crystal is not required. In particular, optical steering and routing applications may be realized when a two-dimensional photonic crystals constructed from, for instance, macroporous silicon (A. Birner et al., Phys. Stat. Sol. (a) 165, 111 (1998)) is infiltrated with a nematic liquid crystal such as BEHA. We consider a two-dimensional macroporous silicon photonic crystal. This photonic crystal consists of a lattice of air pores etched into macroporous silicon. In such materials, different lattice types such as square or triangular lattices may be realized and the pore spacing as well as the pore diameter can be varied over a wide range. For illustration of the electro-optical tuning of the photonic band structure, we consider a triangular lattice of air pores (see FIG. 11). The air pores are assumed to have a radius r=0.45a, where a is the spacing of adjacent pores of the lattice. We now consider the situation where the air pores are fully infiltrated with the nematic liquid crystal BEHA. The nematic director may be aligned in the plane perpendicular to the pore axis by means of an applied DC electric (external voltage) or magnetic field.

Figure 13:
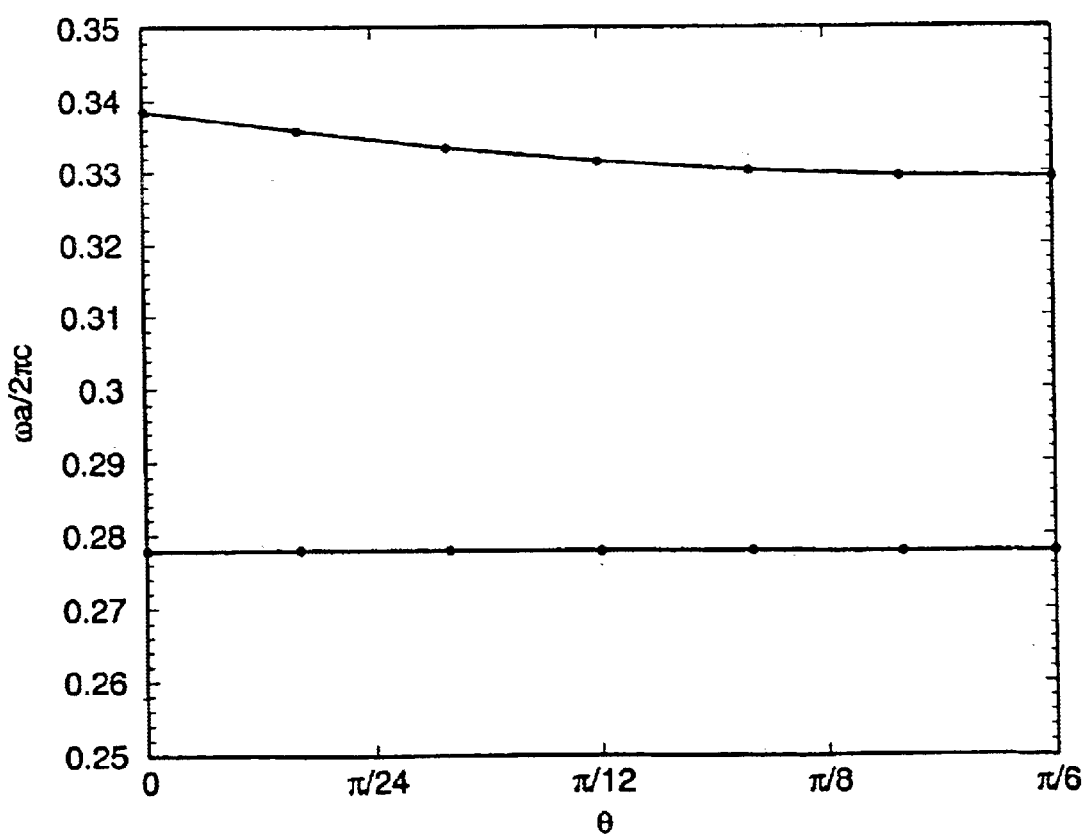
FIG. 13 shows the variation of the upper and lower band edge of H-polarized (magnetic field parallel to the air columns) electromagnetic waves propagating in the plane of periodicity of a two-dimensional photonic crystal made from macroporous silicon. The cylindrical air pores (r=0.45a) have been fully infiltrated with the nematic liquid crystalline material BEHA and the nematic director is rotated in the plane of periodicity enclosing the angle $\theta$ with the y-axis.

FIG. 13 shows the dependence of the photonic band gap between band 1 and 2 for electromagnetic waves propagating in the plane perpendicular to the pore axis and whose magnetic field vector is polarized parallel to the pore axis (H-polarization) on the orientation of the nematic director relative to the isotropic backbone material. We measure this orientation of the nematic director in terms of the angle $\theta$ between the nematic director and the line that connects two adjacent cylinders. Therefore, the angle $\theta$ can vary from 0 to 30 degrees ($\pi/6$ in radian). This line we define as the y-axis. The upper band edge clearly exhibits a strong dependence on the orientation of the nematic director: it varies from a value of about 0.3383 (dimensionless frequency) for $\theta=0$ to a value of about 0.3295 (dimensionless frequency). In contrast, the lower band edge remains practically inert at about 0.2780 (dimensionless frequency). If the structure would be designed such that the midgap frequency for $\theta=0$ would be at 1.5 $\mu$m, the corresponding shift of the upper band edge by rotating the nematic director would be about 45 nm.

Figure 12:
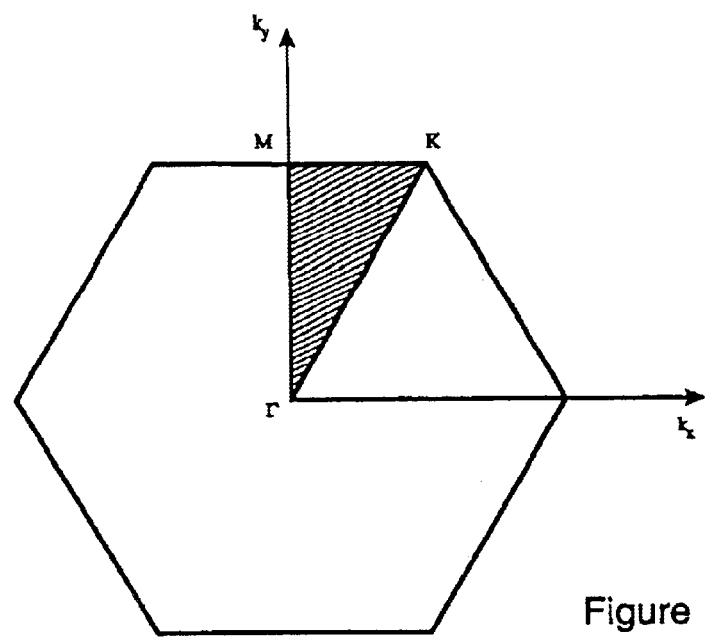
FIG. 12 shows the 2-d Brillouin zone of the triangular lattice of FIG. 11. Depicted are the symmetry points M and K in wave vector $k=(k_x,k_y)$ space. $\Gamma$ corresponds to the origin.
Figure 14:
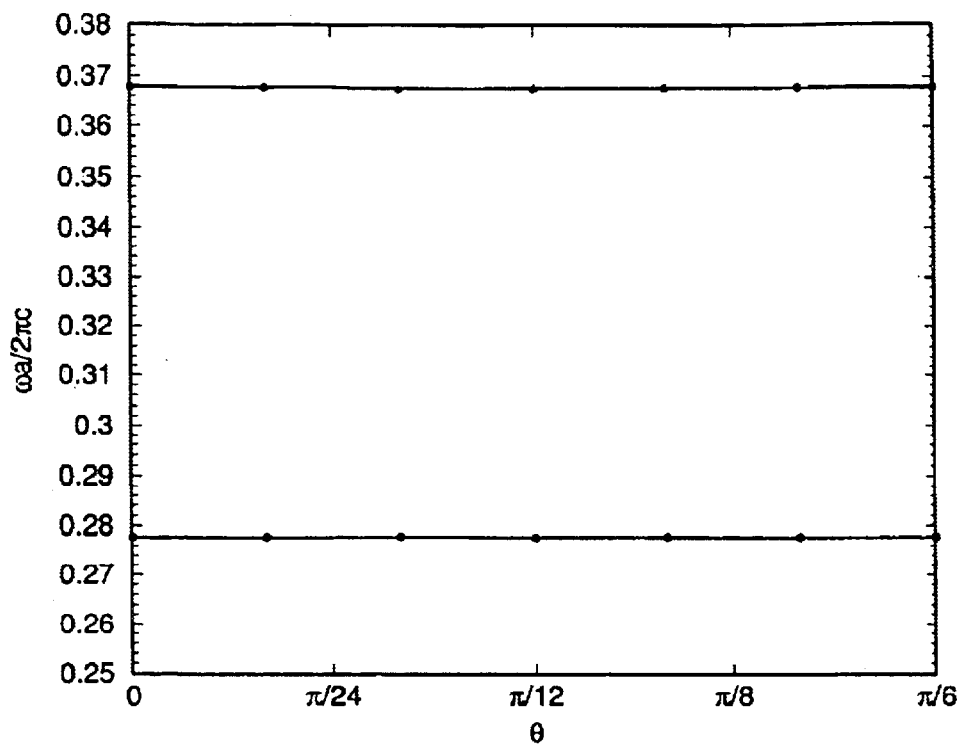
FIG. 14 shows the variation of the upper and lower stop band edges of H-polarized electromagnetic waves propagating in the plane of periodicity along the K-direction of a two-dimensional photonic crystal made from macroporous silicon. The air pores (r=0.45a) have been fully infiltrated with the nematic liquid crystalline material BEHA and the nematic director is rotated in the plane of periodicity enclosing the angle $\theta$ with the y-axis.
Figure 15:
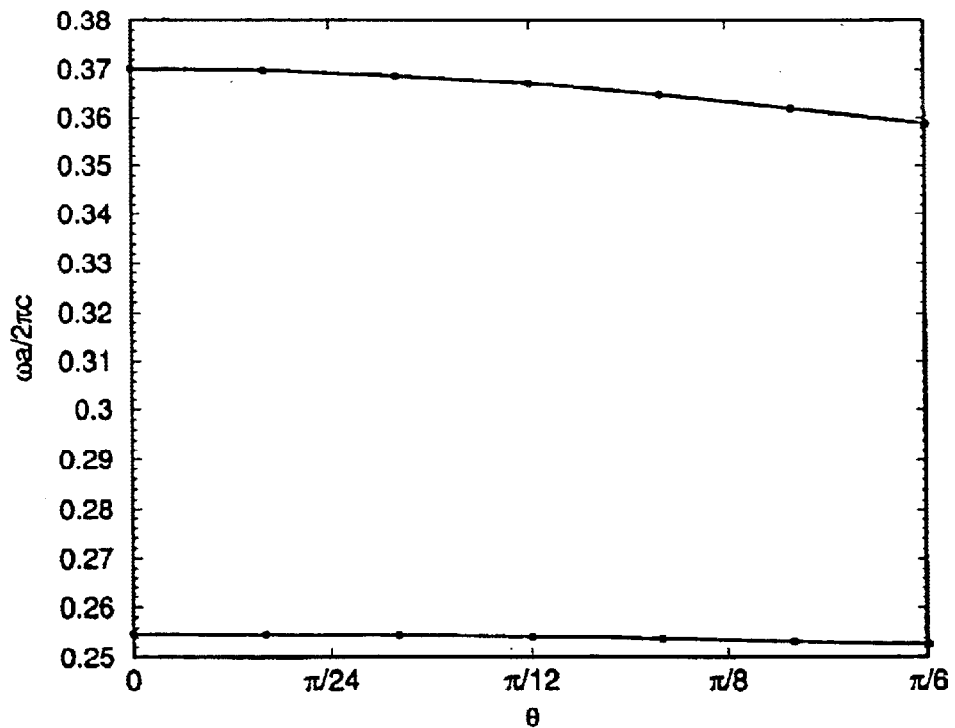
FIG. 15 shows the variation of the upper and lower stop band edges of H-polarized electromagnetic waves propagating in the plane of periodicity along the M-direction of a two-dimensional photonic crystal made from macroporous silicon. The air pores (r=0.45a) have been fully infiltrated with the nematic liquid crystalline material BEHA and the nematic director is rotated in the plane of periodicity enclosing the angle $\theta$ with the y-axis.

In FIG. 14 and FIG. 15 we show the dependence the stop-gap size between band 1 and 2 for two selected high-symmetry direction. FIG. 14 shows the variation of the upper and lower band edge at the K-point K=$2\pi(1/3,1/3^{1/2})$, as labeled in FIG. 12, as the nematic director is rotated. Similarly, FIG. 15 shows the variation of the upper and lower band edge at the M-point M=$2\pi(0,1/3^{1/2})$ as the nematic director is rotated. While the upper edge of the stop band along the M-direction may be tuned from about 0.3700 to 0.3592 (dimensionless frequency), the lower stop band edge as well as the stop band edges along the K-direction remain inert. This illustrates the use of a two-dimensional composite photonic crystal material as tunable optical filter which can selectively pass or stop light over a significant bandwidth.

EXAMPLE 4
Alternative Optically Anisotropic Materials

In the previous illustrations, the photonic band structure of two- and three-dimensional photonic crystals have been tuned using the large optical anisotropies and ease of reorienting the latter provided by nematic liquid crystalline materials. There are numerous other types of optical anisotropies that can be utilized for tuning the photonic band structure. These optical anisotropies include, for instance, chirality (e.g., natural optical activity of glucose molecules, cholesteric liquid crystals etc.) and Faraday-activity.

As an illustration of the above, we consider the an optimal (24.5% by volume) silicon inverse opal. Furthermore, we assume that the silicon exhibits a strong Faraday-activity, which, for instance, may achieved by implanting magnetic ions with sufficient concentration into the silicon material. In the simplest model, the optical anisotropy is characterized by the product of the Verdet constant (material parameter that described the degree of Faraday-activity of the material) and the magnitude as well as the vector of orientation of the applied DC magnetic field.

Figure 16:
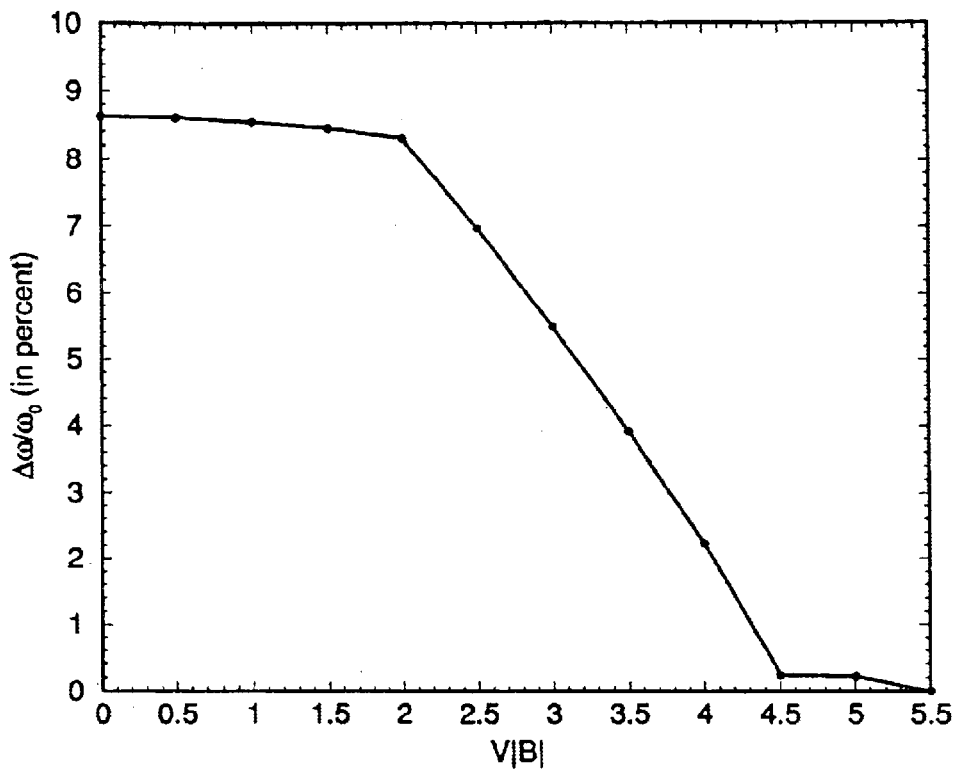
FIG. 16 shows the dependence of the gap size between band 8 and 9 on the product of Verdet constant and magnitude of the applied DC magnetic field, $V|B|$, for an orientation of the magnetic field along the (1,1,1) direction. Here the backbone of the inverse opal has an average refractive index of 3.45.

FIG. 16 shows the dependence of the gap size between band 8 and 9 on the product of Verdet constant and magnitude of the applied DC magnetic field, V|B|, for an orientation of the magnetic field along the $(1,1,1)/3^{1/2}$ direction. As the V|B| is increased the complete photonic band gap of the structure closes. This clearly demonstrates the same shutter effect of the complete three-dimensional photonic band gap which may be realized by an external magnetic field.

Figure 17:
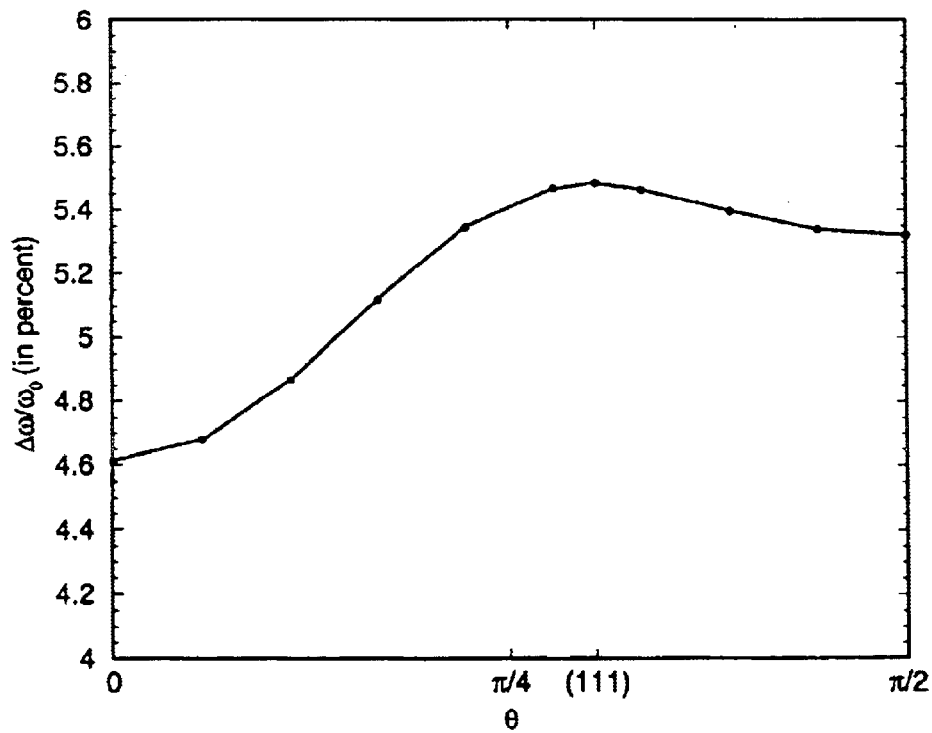
FIG. 17 shows the dependence of the gap size between band 8 and 9 on the orientation of the applied DC magnetic field relative to the isotropic backbone for a fixed value of the product of Verdet constant and magnitude of the applied DC magnetic field, $V|B|=3.0$. The direction of the applied magnetic field rotates from (0,0,1) through (1,1,1) to the (1,1,0) direction. In terms of spherical coordinates, $\phi=\pi/4$ and $\theta$ ranges from 0 to $\pi/2$.

FIG. 17 shows the dependence of the gap size between band 8 and 9 on the orientation of the applied DC magnetic field relative to the isotropic backbone for a fixed value of the product of Verdet constant and magnitude of the applied DC magnetic field, V|B|=3.0. The direction of the applied magnetic field rotates from (0,0,1) through (1,1,1) to the (1,1,0) direction. In terms of spherical coordinates, $\phi=\pi/4$ and $\theta$ ranges from 0 to $\pi/2$. The Faraday-active PBG material exhibits a clear tunability of the size of the complete three-dimensional photonic band gap. For the case considered, the size of the photonic band gap varies between a minimal value of about 4.6% (magnetic field orientated along (0,0,1)) and a maximal value 5.5% (magnetic field orientated along $(1,1,1)/3^{1/2}$). This clearly demonstrates that other forms of optical anisotropy such as for instance Faraday-activity and chirality may be utilized to achieve tunability of photonic band structures in two- and three-dimensional photonic crystals.

The silicon inverse opal PBG material with the tunable photonic band structure has been described above using the liquid crystal BEHA as an exemplary material for infiltration. It will be appreciated by those skilled in the art that other materials could be used in addition to BEHA and this invention is in no way limited to this embodiment. For example, the company Merck produce a set of liquid crystal (LC) materials that go under the general name TL2xx. For instance, TL213 has an optical anisotropy of $\Delta n=0.239$. This class of LC is characterized by large capillary forces and low viscosities, ideal properties for ease of infiltration. Another class of LCs is named "Silan". Their characteristic is that they posses a Si—C bond which would react with a Si—O—H group on a $SiO_2$ surface at 100° C. They would nicely bond to things where the Si surfaces may be oxidized.

In addition to liquid crystals, various ferro-electric materials may be used for infiltration into photonic crystals. Ferro-electric materials exhibiting optical anisotropy and birefringence (polarization dependent refractive index) and weak electro-optic effects are well known (see for instance Landolt and Bornstein (LB), Numerical Data and Functional Relationships in Science and Technology, Group III, Volume 16: Ferroelectrics and Related Substances, subvolume a: Oxides, Springer-Verlag 1981). In the absence of a photonic crystal, the relatively weak optical anisotropy and birefringence of ordinary ferroelectrics limits the utility of such materials for electro-optically steering the flow of light. Surprisingly however, in the context of a photonic crystal, the high sensitivity of the photonic band structure to small changes in the refractive index leads to a dramatic amplification of the electro-optic effect. Non-limiting examples include ferroelectric oxides such as: (see LB III/volume 16, Ferroelectrics and Related Substances, subvolume a: Oxides, Springer Verlag (1981)

(i) $NaNbO_3$, (p. 46) indices: na=2.13, nb=2.21, nc=2.25 at 589 nm;

(ii) LiNbO, (one of the most often used materials in second harmonic generation) (p. 154) indices: no=2.4317, ne=2.326 at 404 nm;

(iii) $KNbO_3$, (p. 51) indices: na=2.2200, nb=2.2574, nc=2.1196 at 1064 nm;

(iv) $WO_3$, (p. 147) indices: na=2.703, nb=2.376, nc=2.283;

Other examples include:
(see LBIII/16b, Ferroelectrics: Non-oxides)

(i) $NaNO_2$, (p. 53) indices: na=1.345, nb=1.412, nc=1.655;

(ii) $KNO_3$, (p. 63) indices: na=1.331, nb=1.4998, nc=1.5 at 656 nm;

(iii) KDP family, $KH_2PO_4$ (p. 79) indices: na=1.509, nb=1.468 at 600 nm;

(iv) TGS family, $(NH_2CH_2COOH)_3*H_2SO_4$ (p. 223) indices: na=1.590, nb=1.559, nc=1.486 at 529 nm; (see FIG. 1280 on p. 616)

(v) $KIO_3$, (p. 270) indices: na=1.7, nb=1.828, nc=1.832 at 589.3 nm; and (vi) $NH_4IO_3$, (p. 272) indices: na=1.777, nb=1.785, nc=1.826.

In addition to liquid crystals and ferroelectrics, other magneto-optically active materials for infiltration into a photonic crystal may be used as discussed in above. Faraday rotation of iron and non-iron garnets (see LBIII/12a, Magnetic Oxides and Related Compounds, part a, p. 189 and p. 323, respectively) may be appreciable. Iron garnets have indices ranging from 2.0 . . . 2.4. Non-iron garnets have indices from 1.8 . . . 2.0. Faraday rotation may be greatly enhanced by doping with magnetic impurities such as $V^{4+}$, $Co^{2+}$, $Co^{3+}$, $Fe^{2+}$, $Sc^{3+}$ and $Ga^{3+}$.

EXAMPLE 5

Alternative Materials for Use in the Backbone of Photonic Crystal (see LB 111/17a Semiconductors)

(i) Si (p. 70) index: n=3.51 at 1200 nm, Verdet constant (Faraday) $4\times10^{-5}$ degree/(m*T);

(ii) Ge (p. 113) index: n=4 at 2400 nm;

(iii) SiC (p. 138) indices no=2.71 ne=2.80 at 435 nm;

(iv) AIP (p. 163) index: n=2.75 . . . 3.1 for photon energies 0.5–2.8 eV;

(v) AlAs (p. 167) index: n=2.88 . . . 3.2 for photon energies 0.5–2.3 eV;

(vi) AlSb (p. 174) index: n=3.3 at 2000 nm, n=3.445 at 1100 nm;

(vii) GaP (p. 208) index: n=3.17 at 1000 nm;

(viii) GaAs (p. 242) index: n=3.347 at 1000 nm, n=4.025 at 546 nm;

(ix) GaSb (p. 271) index: n=3.92 at 1550 nm;

(x) InP (p. 290) index: n=3.41 at 653 nm;

(xi) InAs (p. 303) index: n=3.51 at 1380 nm n=4.56 at 517 nm; and (xii) InSb (p. 323) index: n=4.03 at 2070 nm n=5.13 at 689 nm.

(see LB III/17b: Semiconductors)

(i) ZnO (p. 52) index: n=2.25 at 405 nm;

(ii) ZnSe (p. 147) index: n=2.485 at 1000 nm, verdet constant $1*10^4$ min/(cm*T) at 496 nm;

(iii) CdSe (p. 218) indices: no=2.6 ne=2.63 at 850 nm; and (iv) HgS (p. 233) indices: no=3.256 ne=2.903 at 620 nm. This is quite a large anisotropy.

The photonic crystal dielectric composite may consist of a tunable backbone, with high refractive index, and a periodic array of void regions of air e.g. overlapping air spheres in the fcc inverted opal structure. Alternatively, the photonic crystal may consist of a non-tunable backbone and one or more tunable (optically anisotropic) materials which either fill or partially fill the air pores. It may also consist of a tunable backbone, with high refractive index, and, instead of air voids, another dielectric solid having sufficiently low refractive index so that the composite dielectric material has a photonic band structure.

EXAMPLE 6

Defect Structures

The tunability can be incorporated either locally or globally within the photonic crystal or photonic band gap material. For example, an optical waveguide channel passing through a photonic crystal can carry many different optical wavelengths each containing a single channel of data transmission. A defect (a specified deviation from perfect periodicity) in the photonic crystal placed near the waveguide channel can facilitate resonant coupling of a particular wavelength channel either from the waveguide into the defect or from the defect into the waveguide. In this way, the defect can act as an add- drop-filter for optical telecommunications. By making the defect structure contain a tunable material, channel selection can be made by application of an external field to the defect region, thereby changing its resonance frequency. In this way a tunable add-drop-filter can be constructed for wavelength division multiplexed (WDM) telecommunication networks.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A photonic crystal having a tunable photonic band structure, comprising; a periodic composite dielectric material having at least two dielectric constituents including a first dielectric constituent having a first refractive index and a second dielectric constituent having a refractive index smaller than the first refractive index so that the periodic composite dielectric material has a photonic band structure, said periodic composite dielectric material including periodic void regions throughout a volume of said periodic composite dielectric material:

at least one of said at least two dielectric constituents having refractive index properties which can be locally or globally changed throughout said photonic crystal in a controlled manner whereby changing the refractive index properties modulates said photonic band structure locally or globally throughout said photonic crystal for providing control of propagation of light through said photonic crystal; and said at least one of the at least two dielectric constituents having refractive index properties which can be globally or locally changed including a dielectric constitutent having optical anisotropy infiltrated into said void regions, and wherein said optical anistropy is controlled by application of one of an electric, magnetic and electromagnetic field.

2. The photonic crystal according to claim 1 wherein said periodic composite dielectric material is an inverted opal wherein said void regions are overlapping air spheres formed in a face centered cubic lattice.

3. The photonic crystal according to claim 2 wherein said periodic composite dielectric structure includes a complete photonic bandgap which is tunable.

4. The photonic crystal according to claim 3 wherein said first dielectric constituent is a semiconductor.

5. The photonic crystal according to claim 4 wherein said at least one of the at least two dielectric constituents having refractive index properties which can be globally or locally changed includes a dielectric constituent having optical anisotropy infiltrated into said void regions, and wherein said optical anisotropy is controlled by application of one of an electric, magnetic and electromagnetic field.

6. The photonic crystal according to claim 5 wherein said dielectric constituent having optical anisotropy infiltrated into said void regions is selected from the group consisting of optically anisotropic compounds, ferroelectric materials exhibiting optical birefringence, and materials exhibiting Faraday-activity.

7. The photonic crystal according to claim 6 wherein said optically anisotropic compounds are selected from the group consisting of nematic liquid crystals and chiral molecules including cholesteric liquid crystals.

8. The photonic crystal according to claim 7 wherein said optically anisotropic compounds is a nematic liquid crystal, and wherein said band structure is modulated either globally or locally by rotations of a nematic director field of the nematic liquid crystal by application of an external electric field.

9. The photonic crystal according to claim 8 wherein said nematic liquid crystal is bis ethylhexyladipate (BEHA).

10. The photonic crystal according to claim 9 wherein said semiconductor is silicon.

11. The photonic crystal according to claim 10 wherein the periodic composite dielectric material has a lattice periodicity ranging from about 0.28 microns to about 1.8 microns.

12. The photonic crystal according to claim 11 wherein said void regions are infiltrated either partially or fully with said bis ethylhexyladipate (BEHA).

13. The photonic crystal according to claim 8 wherein said semiconductor is selected from the group consisting of Si, Ge, SiC, AlP, AlS, AsSb, GaP, GaAs, GaSb, InP, InAs, InSb, ZnO, ZnSe, CdSe and HgS.

14. The photonic crystal according to claim 6 wherein said optically anisotropic compounds is a nematic liquid crystal, and wherein said band structure is modulated either globally or locally by rotations of a nematic director field of the nematic liquid crystal by application of an external electric field.

15. The photonic crystal according to claim 14 wherein said nematic liquid crystal is bis ethylhexyladipate (BEHA).

16. The photonic crystal according to claim 6 wherein the periodic composite dielectric material has a lattice periodicity ranging from about 0.28 microns to about 1.8 microns.

17. The photonic crystal according to claim 16 wherein said void regions are infiltrated either partially or fully with said optically anisotropic compound.

18. The photonic crystal according to claim 6 wherein said at least one of said at least two dielectric constituents having refractive index properties which can be globally or locally changed includes said semiconductor having implanted therein with a sufficient concentration of magnetic ions to exhibit Faraday-activity, and wherein said refractive index properties are changed by application of a magnetic field.

19. The photonic crystal according to claim 6 wherein said semiconductor is selected from the group consisting of Si, Ge, SiC, Alp, AlS, AsSb, GaP, GaAs, GaSb, InP, InAs, InSb, ZnO, ZnSe, CdSe and HgS.

20. The photonic crystal according to claim 3 wherein said at least one of the at least two dielectric constituents having refractive index properties which can be globally or locally changed includes a dielectric constituent having optical anisotropy infiltrated into said void regions, and wherein said optical anisotropy is controlled by application of one of an electric, magnetic and electromagnetic field.

21. The photonic crystal according to claim 20 wherein said dielectric constituent having optical anisotropy infiltrated into said void regions is selected from the group consisting of optically anisotropic compounds, ferroelectric materials exhibiting optical birefringence, and materials exhibiting Faraday-activity.

22. The photonic crystal according to claim 21 wherein said optically anisotropic compounds are selected from the group consisting of nematic liquid crystals and chiral molecules including cholesteric liquid crystals.

23. The photonic crystal according to claim 22 wherein said optically anisotropic compounds is a nematic liquid crystal, and wherein said band structure is modulated either globally or locally by rotations of a nematic director field of the nematic liquid crystal by application of an external electric field.

24. The photonic crystal according to claim 23 wherein said nematic liquid crystal is bis ethylhexyladipate (BEHA).

25. The photonic crystal according to claim 23 wherein said void regions are infiltrated either partially or fully with an optically anisotropic compound.

26. The photonic crystal according to claim 2 wherein said first dielectric constituent is a semiconductor.

27. The photonic crystal according to claim 2 wherein said at least one of the at least two dielectric constituents having refractive index properties which can be globally or locally changed includes a dielectric constituent having optical anisotropy infiltrated into said void regions, and wherein said optical anisotropy is controlled by application of one of an electric, magnetic and electromagnetic field.

28. The photonic crystal according to claim 27 wherein said dielectric constituent having optical anisotropy infiltrated into said void regions is selected from the group consisting of optically anisotropic compounds, ferroelectric materials exhibiting optical birefringence, and materials exhibiting Faraday-activity.

29. The photonic crystal according to claim 28 wherein said optically anisotropic compounds are selected from the group consisting of nematic liquid crystals and chiral molecules including cholesteric liquid crystals.

30. The photonic crystal according to claim 29 wherein said optically anisotropic compounds is a nematic liquid crystal, and wherein said band structure is modulated either globally or locally by rotations of a nematic director field of the nematic liquid crystal by application of an external electric field.

31. The photonic crystal according to claim 30 wherein said nematic liquid crystal is bis ethylhexyladipate (BEHA).

32. The photonic crystal according to claim 1 wherein said periodic composite dielectric structure includes a complete photonic bandgap which is tunable.

33. The photonic crystal according to claim 1 wherein said first dielectric constituent is a semiconductor.

34. A photonic crystal having a tunable photonic band structure, comprising;
   a periodic composite dielectric material having a first dielectric constituent having a first refractive index and void regions located periodically throughout a volume of said periodic composite dielectric material, a second dielectric constituent located in said void regions having a second refractive index sufficiently smaller than the first refractive index so that the periodic composite dielectric material has a photonic band structure; and
   at least one of said first and second dielectric constituents being optically anisotropic and having refractive index properties which can be locally or globally modified in a controlled manner whereby changing the refractive index properties changes said photonic band structure for providing control of propagation of light through said photonic crystal.

35. The photonic crystal according to claim 34 wherein said first dielectric constituent is optically anisotropic and the refractive index properties of said first dielectric constituent can be changed, and wherein said second dielectric constituent is air.

36. The photonic crystal according to claim 35 wherein said first dielectric constituent is a semiconductor.

37. The photonic crystal according to claim 31 wherein said periodic composite dielectric material has at least one complete photonic band gap which is tunable.

38. The photonic crystal according to claim 37 wherein said second dielectric constituent includes at least one optically anisotropic material infiltrated into said void regions, and wherein it is the refractive index properties of said anisotropic material which can be changed in a controlled manner.

39. The photonic crystal according to claim 38 wherein said void regions are partially filled with said optically anisotropic material.

40. The photonic crystal according to claim 39 wherein said void regions are completely filled with said optically anisotropic material.

41. The photonic crystal according to claim 38 wherein the refractive index properties of said constituent having optical anisotropy is controlled by application of one of an electric, magnetic and electromagnetic field.

42. The photonic crystal according to claim 41 wherein the periodic composite dielectric material has a lattice periodicity ranging from about 0.28 microns to about 1.8 microns.

43. The photonic crystal according to claim 38 wherein said semiconductor is selected from the group consisting of Si, Ge, SiC, AlP, AlS, AsSb, GaP, GaAs, GaSb, InP, InAs, InSb, ZnO, ZnSe, CdSe and HgS.

44. The photonic crystal according to claim 38 wherein said semiconductor is silicon and said periodic composite dielectric material is an inverse silicon opal, and wherein said void regions are overlapping air spheres formed in a face centered cubic lattice.

45. The photonic crystal according to claim 44 wherein said complete photonic bandgap is centered on a wavelength of about 1.5 microns.

46. The photonic crystal according to claim 45 wherein said optically anisotropic material infiltrated into said void regions is selected from the group consisting of optically anisotropic molecules, ferroelectric materials exhibiting optical birefringence, and materials exhibiting Faraday-activity.

47. The photonic crystal according to claim 46 wherein said optically anisotropic molecules are selected from the group consisting of nematic liquid crystals and chiral molecules including cholesteric liquid crystals.

48. The photonic crystal according to claim 46 wherein said optically anisotropic molecules is a nematic liquid crystal, and wherein said band structure is modulated either globally or locally by rotations of a nematic director field of the nematic liquid crystal by application of an external electric field globally to the entire photonic crystal or locally to preselected portions of said photonic crystal.

49. The photonic crystal according to claim 37 wherein the refractive index properties of the constituent having optical anisotropy is controlled by application of one of an electric, magnetic and electromagnetic field.

50. The photonic crystal according to claim 37 wherein the periodic composite dielectric material has a lattice periodicity ranging from about 0.28 microns to about 1.8 microns.

51. The photonic crystal according to claim 50 wherein said optically anisotropic material infiltrated into said void regions is selected from the group consisting of optically anisotropic molecules, ferroelectric materials exhibiting optical birefringence, and materials exhibiting Faraday-activity.

52. The photonic crystal according to claim 31 wherein the periodic composite dielectric material has a lattice periodicity ranging from about 0.28 microns to about 1.8 microns.

53. The photonic crystal according to claim 52 wherein said periodic composite dielectric material has at least one complete photonic band gap which is tunable.

54. The photonic crystal according to claim 53 wherein said semiconductor is selected from the group consisting of Si, Ge, SiC, AlP, AlS, AsSb, GaP, GaAs, GaSb, InP, InAs, InSb, ZnO, ZnSe, CdSe and HgS.

55. The photonic crystal according to claim 31 wherein said periodic composite material has a structure selected from the group consisting of woodpile structures, inverse diamond structures, Yablonovite structures, spiral pillars and two dimensional periodic structures.

56. The photonic crystal according to claim 35 wherein the refractive index properties of the constituent having optical anisotropy is controlled by application of one of an electric, magnetic and electromagnetic field.

57. The photonic crystal according to claim 34 wherein said first dielectric constituent is a semiconductor is selected from the group consisting of Si, Ge, SiC, Alp, AlS, AsSb, GaP, GaAs, GaSb, InP, InAs, InSb, ZnO, ZnSe, CdSe and HgS, and wherein said periodic composite dielectric material has at least one complete photonic band gap which is tunable.

58. A method of tuning a photnic band structure in a photonic cystal, comprising;
providing a photonic crystal having a periodic composite dielectric material including a first dielectric constituent having a first refractive index, and at least a second dielectric constituent having a second refractive index sufficiently smaller than the first refractive index so that the periodic composite dielectric material has a photonic band structure and wherein said periodic composite dielectric material has periodic void regions throughout a volume of said periodic composite dielectric material, said periodic composite dielectric material having an inverse opal structure, and wherein said void regions are overlapping air spheres formed in a face centered cubic lattice, wherein said second dielectric constituent includes at least one optically anisotropic material infiltrated into said void regions, and wherein the refractive index properties of said anisotropic material can be changed in a controlled manner; and
globally or locally changing the refractive index properties of one of said first and second dielectric constituents in a controlled manner so that said photonic band structure is changed in a controlled manner by application of one of an electric, magnetic and electromagnetic field for providing control of propagation of light through said photonic crystal.

59. The method according to claim 58 wherein said optically anisotropic material infiltrated into said void regions is selected from the group consisting of optically anisotropic molecules, ferroelectric materials exhibiting optical birefringence, and materials exhibiting Faraday-activity.

60. The method according to claim 59 wherein said optically anisotropic molecules are selected from the group consisting of nematic liquid crystals and chiral molecules including cholesteric liquid crystals.

61. The method according to claim 60 wherein said optically anisotropic molecules is a nematic liquid crystal, and wherein said band structure is modulated either globally or locally by rotations of a nematic director field of the nematic liquid crystal by application of an external electric field globally to the entire photonic crystal or locally to preselected portions of said photonic crystal.

62. A method of tuning a photonic band structure in a photonic crystal, comprising;
providing a photonic crystal having a periodic composite dielectric material including a first dielectric constituent having a first refractive index, and at least a second dielectric constituent having a second refractive index sufficiently smaller than the first refractive index so that the periodic composite dielectric material has a photonic band structure wherein said first dielectric constituent is optically anisotropic and the refractive index properties of said first dielectric constituent can be changed, wherein said periodic composite dielectric material has periodic void regions throughout a volume of said periodic composite dielectric material, and wherein said periodic composite dielectric material has an inverse opal structure, and wherein said void regions are overlapping air spheres formed in a face centered cubic lattice, and wherein said second dielectric constituent is air; and
globally or locally changing the refractive index properties of one of said first and second dielectric constituents in a controlled manner so that said photonic band structure is changed in a controlled manner by application of one of an electric, magnetic arid electromagnetic field for providing control of propagation of light through said photonic crystal.

63. The method according to claim 62 wherein said first dielectric constituent includes a semiconductor.

64. A method of tuning a photonic band structure in a photonic cystal, comprising;
providing a photonic crystal having a periodic composite dielectric material including a first dielectric constituent having a first refractive index, and at least a second dielectric constituent having a second refractive index sufficiently smaller than the first refractive index so that the periodic composite dielectric material has a photonic band structure wherein said first dielectric constituent is optically anisotropic and the refractive index properties of said first dielectric constituent can be changed, and wherein said second dielectric constituent is a dielectric solid dielectric material;
globally or locally changing the refractive index properties of one of said first and second dielectric constituents in a controlled manner so that said photonic band structure is changed in a controlled manner by application of one of an electric, magnetic and electromagnetic field for providing control of propagation of light through said photonic crystal.

* * * * *